(12) United States Patent
Yoshikawa et al.

(10) Patent No.: US 8,227,141 B2
(45) Date of Patent: Jul. 24, 2012

(54) FUEL CELL, METHOD OF MANUFACTURING FUEL CELL, AND UNIT CELL ASSEMBLY

(75) Inventors: Hiroo Yoshikawa, Susono (JP); Fumishige Shizuku, Komaki (JP); Kenji Sato, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 652 days.

(21) Appl. No.: 12/446,525

(22) PCT Filed: Nov. 12, 2007

(86) PCT No.: PCT/JP2007/072334
§ 371 (c)(1),
(2), (4) Date: Apr. 21, 2009

(87) PCT Pub. No.: WO2008/059980
PCT Pub. Date: May 22, 2008

(65) Prior Publication Data
US 2010/0316934 A1  Dec. 16, 2010

(30) Foreign Application Priority Data

Nov. 14, 2006 (JP) .................. 2006-307593

(51) Int. Cl.
*H01M 2/08* (2006.01)
*H01M 2/14* (2006.01)
*H01M 2/38* (2006.01)
*H01M 2/40* (2006.01)

(52) U.S. Cl. ......... 429/508; 429/507; 429/457; 429/456

(58) Field of Classification Search .................. 429/508, 429/507, 457, 456
See application file for complete search history.

(56) References Cited

U.S. PATENT DOCUMENTS

| 6,610,435 | B1 | 8/2003 | Maruyama et al. |
| 2005/0035560 | A1 | 2/2005 | Segawa et al. |
| 2007/0003816 | A1 | 1/2007 | Sugita et al. |

FOREIGN PATENT DOCUMENTS

| CN | 2 444 246 | 11/2002 |
| DE | 100 48 331 | 4/2005 |
| DE | 603 01 036 | 6/2006 |
| EP | 1 372 203 | 12/2003 |
| JP | 2-148570 | 6/1990 |
| JP | 7-501417 | 2/1995 |
| JP | 8-45517 | 2/1996 |
| JP | 8-148169 | 6/1996 |
| JP | 9-265993 | 10/1997 |
| JP | 2002-42836 | 2/2002 |
| JP | 2002-124276 | 4/2002 |
| JP | 2002-246044 | 8/2002 |
| JP | 2003-157867 | 5/2003 |
| JP | 2003-331850 | 11/2003 |

(Continued)

Primary Examiner — Helen O Conley
(74) Attorney, Agent, or Firm — Finnegan, Henderson, Farabow, Garrett & Dunner, LLP

(57) ABSTRACT

The method of manufacturing a fuel cell including stacked unit cell constituent members sandwiched by separators includes the steps of arranging the unit cell constituent member in a first area on a first face of the separator; and forming a seal member made of elastic material such that the seal member is adhered or intimately attached to a second area including the first area on the first face of the separator, and that the seal member is unified with an edge portion of the unit cell constituent member.

12 Claims, 18 Drawing Sheets

A-A CROSS SECTION

FOREIGN PATENT DOCUMENTS

| | | |
|---|---|---|
| JP | 2004-6104 | 1/2004 |
| JP | 2004-39436 | 2/2004 |
| JP | 2004-331786 | 11/2004 |
| JP | 2005-327514 | 11/2005 |
| JP | 2006-19204 | 1/2006 |
| JP | 2006-92773 | 4/2006 |
| JP | 2006-92889 | 4/2006 |
| JP | 2006-131830 | 5/2006 |
| JP | 2006-216424 | 8/2006 |
| JP | 2007-250228 | 9/2007 |
| WO | WO 99/53559 A1 | 10/1999 |
| WO | WO 02/01658 A1 | 1/2002 |
| WO | WO 02/43172 A1 | 5/2002 |
| WO | WO 02/061869 A1 | 8/2002 |
| WO | WO 2006/062242 A1 | 6/2006 |
| WO | WO 2007/105046 A2 | 9/2007 |

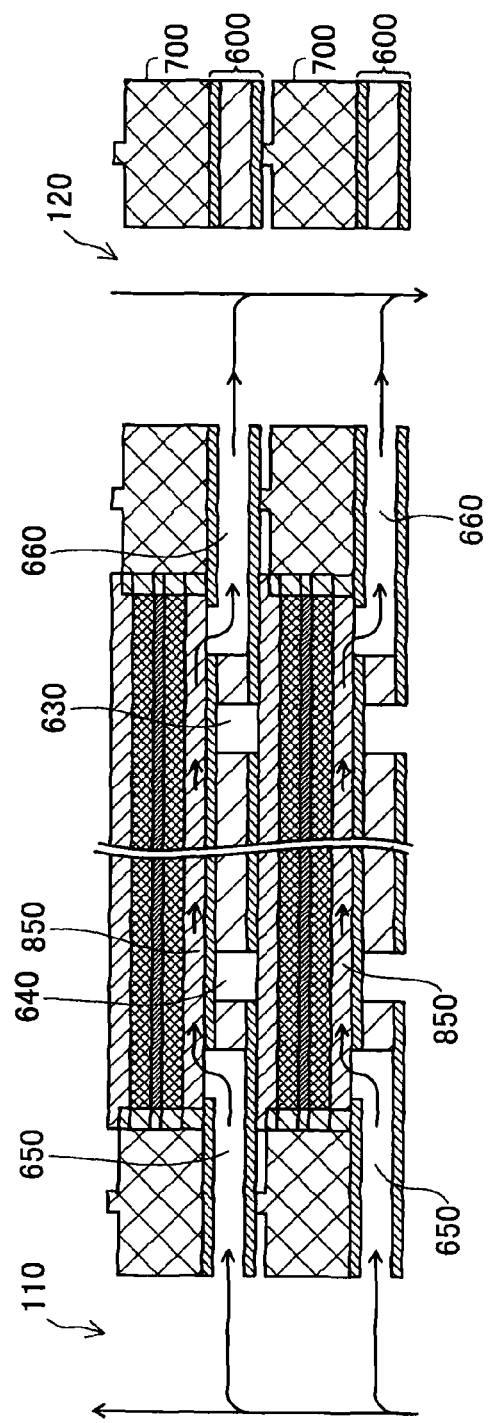
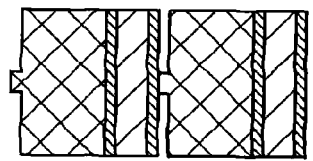
Fig.10A
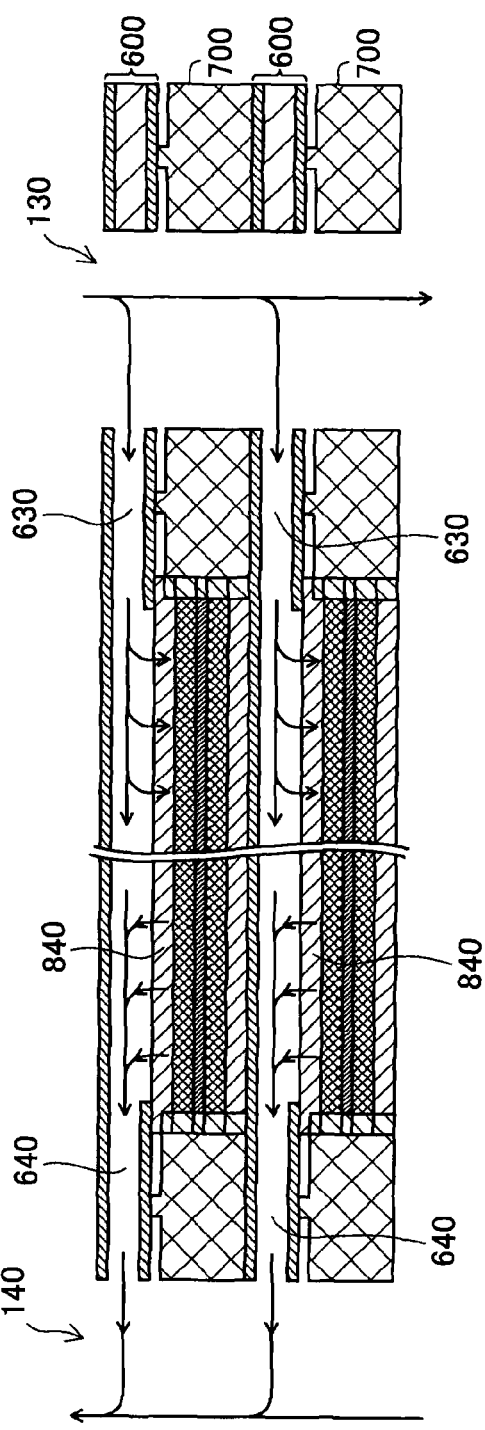
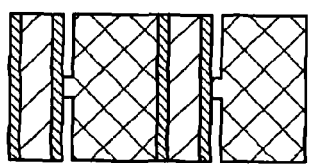
Fig.10B

FUEL CELL, METHOD OF MANUFACTURING FUEL CELL, AND UNIT CELL ASSEMBLY

CROSS-REFERENCE TO RELATED APPLICATIONS

This application is a national phase application of International Application No. PCT/JP2007/072334, filed Nov. 12, 2007, and claims the priority of Japanese Application No. 2006-307593, filed Nov. 14, 2006, the contents of both of which are incorporated herein by reference.

TECHNICAL FIELD

The present invention relates to a fuel cell, to a method of manufacturing a fuel cell, and to a unit cell assembly.

BACKGROUND ART

A fuel cell, for example a solid polymer fuel cell, converts chemical energy of a substance directly to electrical energy through an electrochemical reaction produced by supplying reactant gases (a fuel gas containing hydrogen and an oxidant gas containing oxygen) respectively to two electrodes (a fuel electrode and an oxygen electrode) situated in opposition to either side of an electrolyte membrane. One known principal structure for such fuel cells is a so-called stack structure composed of unit cell constituent members each including a membrane-electrode assembly (MEA) of planar shape and of separators, stacked in alternating layers and connected together in the stacking direction.

In the field of such fuel cells of stack structure, there are known a technology which involves integrally molding a seal member at the edges of the unit cell constituent members which are each composed of a membrane-electrode assembly sandwiched from either side by gas diffusion layers. There is another known technology involving integrally molding the separator, the gas diffusion layer, and the seal member. Using these technologies it has been possible, through the agency of seal members, to inhibit leaking of the fuel gas, the oxidant gas, and the cooling medium to the outside from the fuel cell, and to prevent them from mixing.

However, the conventional technologies discussed above cannot be said to afford sufficient ease of assembly and disassembly of the fuel cell stack. For example, where the technology of integrally forming seal members at the edges of unit cell constituent members is employed, during the assembly operation was necessary to alternately stack the separators and the unit cell constituent members; whereas with the technology of integrally forming the separator, the gas diffusion layer, and the seal member, it was necessary to alternately stack the separator-gas diffusion layer assemblies and the MEAs.

DISCLOSURE OF THE INVENTION

With a view to addressing the above problem, it is one object of the present invention to improve the ease of assembly and/or disassembly of a fuel cell comprising stacked unit cell constituent members sandwiched by separators.

The present invention in a first mode thereof addressed to the above problem provides a method of manufacturing a fuel cell including stacked unit cell constituent members sandwiched by separators. The manufacturing method according to the first mode includes the steps of arranging the unit cell constituent member in a first area on a first face of the separator; and forming a seal member made of elastic material such that the seal member is adhered or intimately attached to a second area including the first area on the first face of the separator, and that the seal member is unified with an edge portion of the unit cell constituent member.

A second mode of the present invention provides a method of manufacturing a fuel cell including stacked unit cell constituent members sandwiched by separators. The manufacturing method according to the second mode includes the steps of arranging the separator in a molding die; arranging the unit cell constituent member in a first area on a first face of the separator; and molding a seal member through injection molding or compression molding of a molding material within a space that is defined by a second area surrounding the first area on the first face of the separator, by an edge portion of the unit cell constituent member, and by the molding die.

According to the manufacturing methods set forth above, the seal member will be molded in such a way as to be adhered or intimately attached to the surface of the separator, as well as being unified with the edge portion of the unit cell constituent member, whereby the number of process steps can be reduced, and ease of assembly of the fuel cell can be improved.

In the manufacturing method according to any one of the above modes, the seal member may be formed in the seal member molding step so as to be adhered or intimately attached with bond strength of 0.01 N/mm or more per unit length of seal lines. By so doing, it will be possible to reduce the level of fastening power necessary to fasten the fuel cell in the stacking direction in such a way as to ensure sealing.

The manufacturing method according to any one of the above modes may further include a step of hot pressing the unit cell constituent member concomitantly with the seal member molding step. By so doing, the number of fuel cell manufacturing steps can be decreased further.

In the manufacturing method according to any one of the above modes, the unit cell constituent member may include an electrolyte layer having catalyst layers arranged on both faces, and gas diffusion layers over the catalyst layers on the both faces of the electrolyte layer. The unit cell constituent member may further include porous bodies arranged over the diffusion layer and the catalyst layer on the both faces of the electrolyte layer.

The manufacturing method according to any one of the above modes may further include the steps of stacking a plurality of assemblies obtained through the stop of forming the seal member; and fastening the plurality of stacked assemblies. As a result, the fuel cell can be manufactured easily.

A third mode of the present invention provides a fuel cell. The fuel cell according to the third mode includes: a first separator; a second separator; a unit cell constituent member arranged between the second separator and a first area on a first face of the first separator; and a seal member having a support part adhered or intimately attached to a second area surrounding the first area on the first separator and unified with an edge portion of the unit cell constituent member, and a rib formed on the support part and contacting the second separator.

According to the fuel cell of the third mode, the support part of the seal member is adhered or intimately attached to the surface of the separator, as well as being unified with the edge portion of the unit cell constituent member, thereby inhibiting deformation of the seal member during assembly, and improving ease of assembly of the fuel cell.

In the fuel cell according to the third mode, the support part and the second area may be adhered or intimately attached with bond strength sufficient to prevent their displacement due to an estimated fluid pressure during operation of the fuel cell. In this instance, the bond strength may be 0.01 N/mm or more per unit length of seal lines. By so doing, it will be possible to reduce the level of fastening power necessary to fasten the fuel cell in the stacking direction in such a way as to ensure sealing.

In the fuel cell according to the third mode, the support part may be made on a cathode side, and the rib may be made on an anode side. By so doing, sealing can be improved on the cathode side, which tends to experience higher gas pressure, so that a defective seal can be avoided.

In the fuel cell according to the third mode, the unit cell constituent member may include an electrolyte layer having catalyst layers arranged on both faces, and gas diffusion layers over the catalyst layers on the both faces of the electrolyte layer. The unit cell constituent member may further include a porous body arranged over the diffusion layer and the catalyst layer on the both faces of the electrolyte layer.

A fourth mode of the present invention provides a fuel cell. The fuel cell according to the third mode includes: a unit cell constituent member; a first separator arranged on a cathode side of the unit cell constituent member; a second separator arranged on an anode side of the unit cell constituent member; and a seal member that is unified with an edge portion of the unit cell constituent member and provides sealing between the first separator and the second separator; wherein a bond strength between the seal member and the first separator differs from a bond strength between the seal member and the second separator.

According to the fuel cell of the fourth mode, because the bond strength between the seal member and the first separator and the bond strength between the seal member and the second separator are different, the fuel cell can be easily detached into the unified separator/seal member/unit cell constituent member assemblies where the separator is boded with the seal member with the higher bond strength. Ease of detachment and ease of maintenance are improved as a result.

A fifth mode of the present invention provides a unit cell assembly for use in stacking a plurality of unit cell assemblies to construct a fuel cell. The unit cell assembly according to the fifth mode includes: a separator; a unit cell constituent member arranged in a first area on a first face of the separator; and a seal member having a support part adhered or intimately attached to a second area surrounding the first area of the separator and unified with an edge portion of the unit cell constituent member, and a rib formed on the support part and adapted to contact the separator of another unit cell assembly when stacked.

According to the unit cell assembly of the fifth mode, a fuel cell can be manufactured easily, simply by stacking multiple unit cell assemblies and fastening them.

The fuel cell of the fourth mode and the unit cell assembly of the fifth mode, like the fuel cell of the third mode, may be reduced to practice in various possible modes. Other additional possible modes of working the present invention include a method of manufacturing a unit cell assembly for use in stacking a plurality of unit cell assemblies to construct a fuel cell, or a unit cell assembly manufactured through this manufacturing method.

BRIEF DESCRIPTION OF THE DRAWINGS

FIGS. 10A and 10B illustrate flows of reactant gas in a fuel cell;

BEST MODE FOR CARRYING OUT THE INVENTION

The fuel cell, the fuel cell manufacturing method, and the unit cell assembly according to the present invention will be described below based on certain preferred embodiments, with reference to the accompanying drawings.

A. EMBODIMENT

Configuration of Fuel Cell

Figure 1:
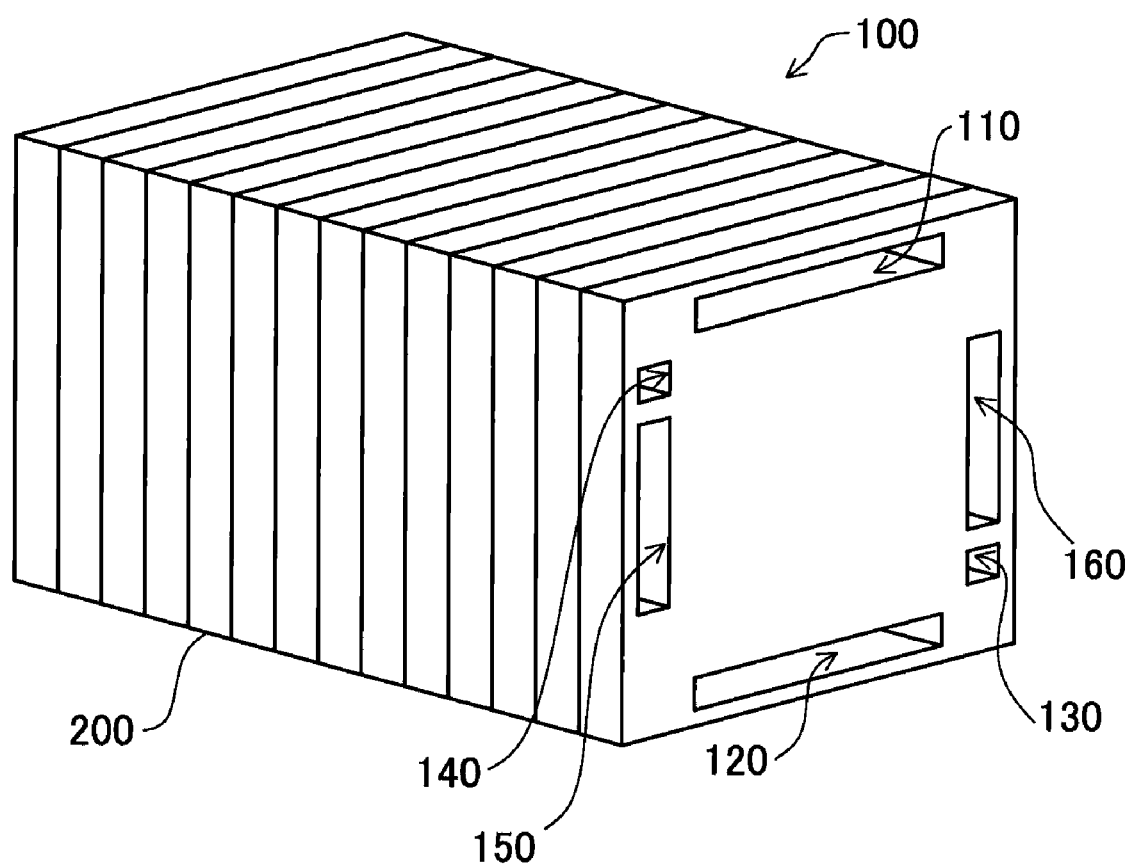
FIG. 1 is a first illustration depicting a configuration of a fuel cell in an embodiment.
Figure 2:
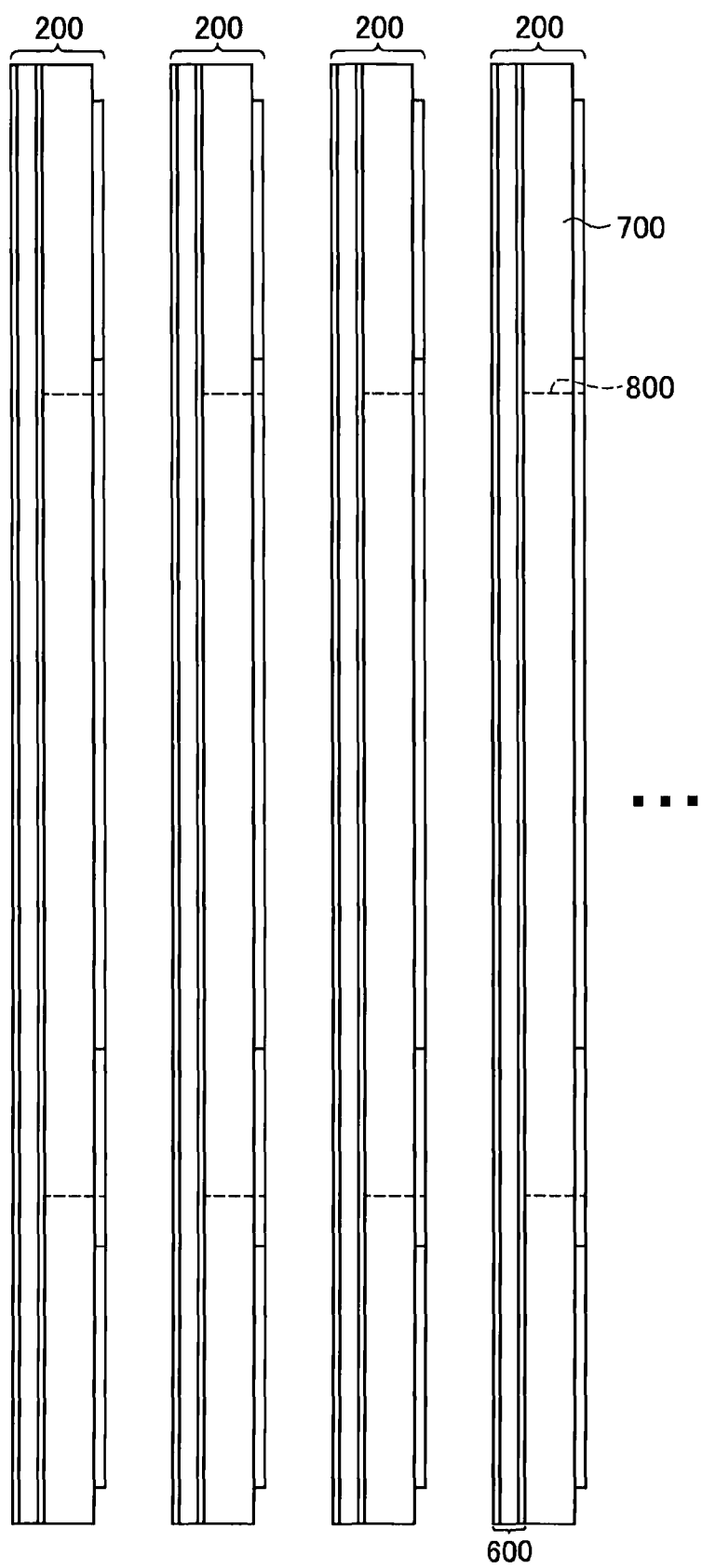
FIG. 2 is a second illustration depicting a configuration of a fuel cell in an embodiment.
Figure 3:
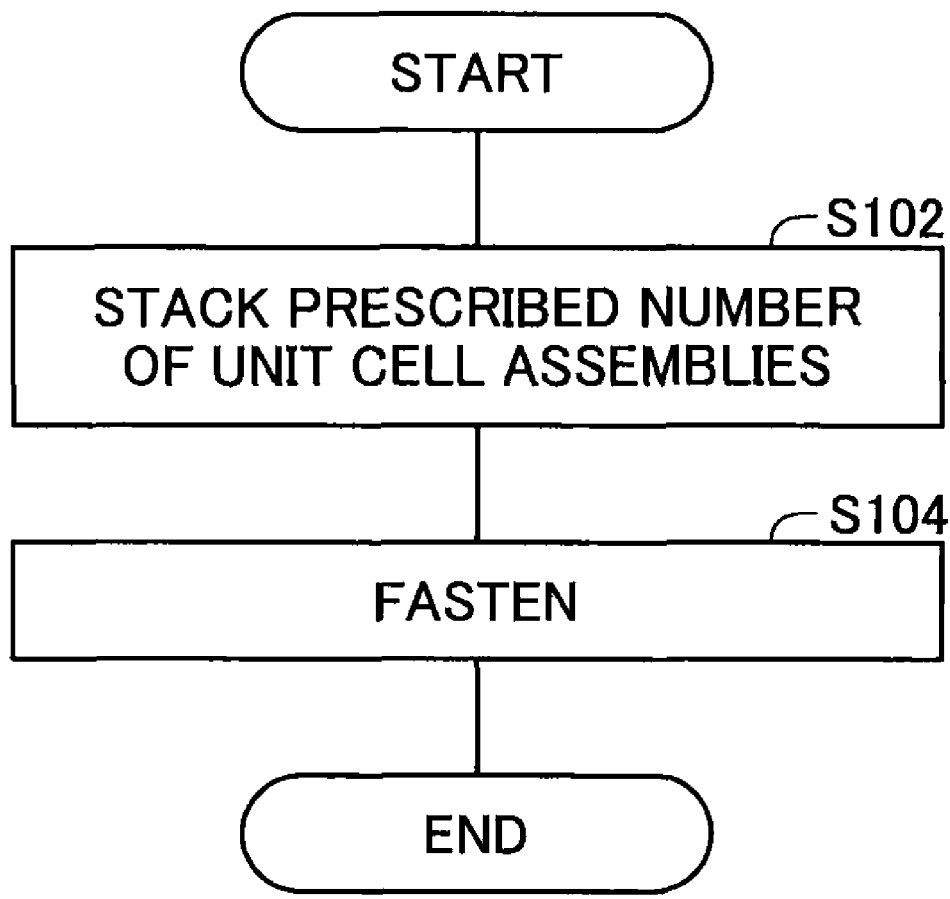
FIG. 3 is a flowchart depicting manufacturing steps of a fuel cell in an embodiment.

The general configuration of a fuel cell according to an embodiment of the present invention will now be described. FIGS. 1 and 2 are illustrations depicting a configuration of a fuel cell in the embodiment. FIG. 3 is a flowchart depicting manufacturing steps of a fuel cell in the embodiment.

As depicted in FIGS. 1 and 2, the fuel cell 100 has a structure including a plurality of stacked unit cell assemblies 200 (termed a stack structure). As depicted in FIG. 3, the fuel cell 100 is manufactured by stacking a prescribed number of the unit cell assemblies 200 (Step S102) and fastening them such that the stacked unit cell assemblies 200 are subjected to a prescribed fastening force load in the stacking direction (Step S104).

As shown in FIG. 1, the fuel cell 100 is furnished with an oxidant gas supply manifold 110 for supplying an oxidant gas, an oxidant gas discharge manifold 120 for discharging the oxidant gas, a fuel gas supply manifold 130 for supplying a fuel gas, a fuel gas discharge manifold 140 for discharging the fuel gas, a cooling medium supply manifold 150 for supplying a cooling medium, and a cooling medium discharge manifold 160 for discharging the cooling medium. Air is typically used as the oxidant gas, while hydrogen is typically used as the fuel gas. The oxidant gas and the fuel gas are also called the reactant gases. The cooling medium may be water, nonfreezing water such as ethylene glycol, air, or the like.

Figure 4:
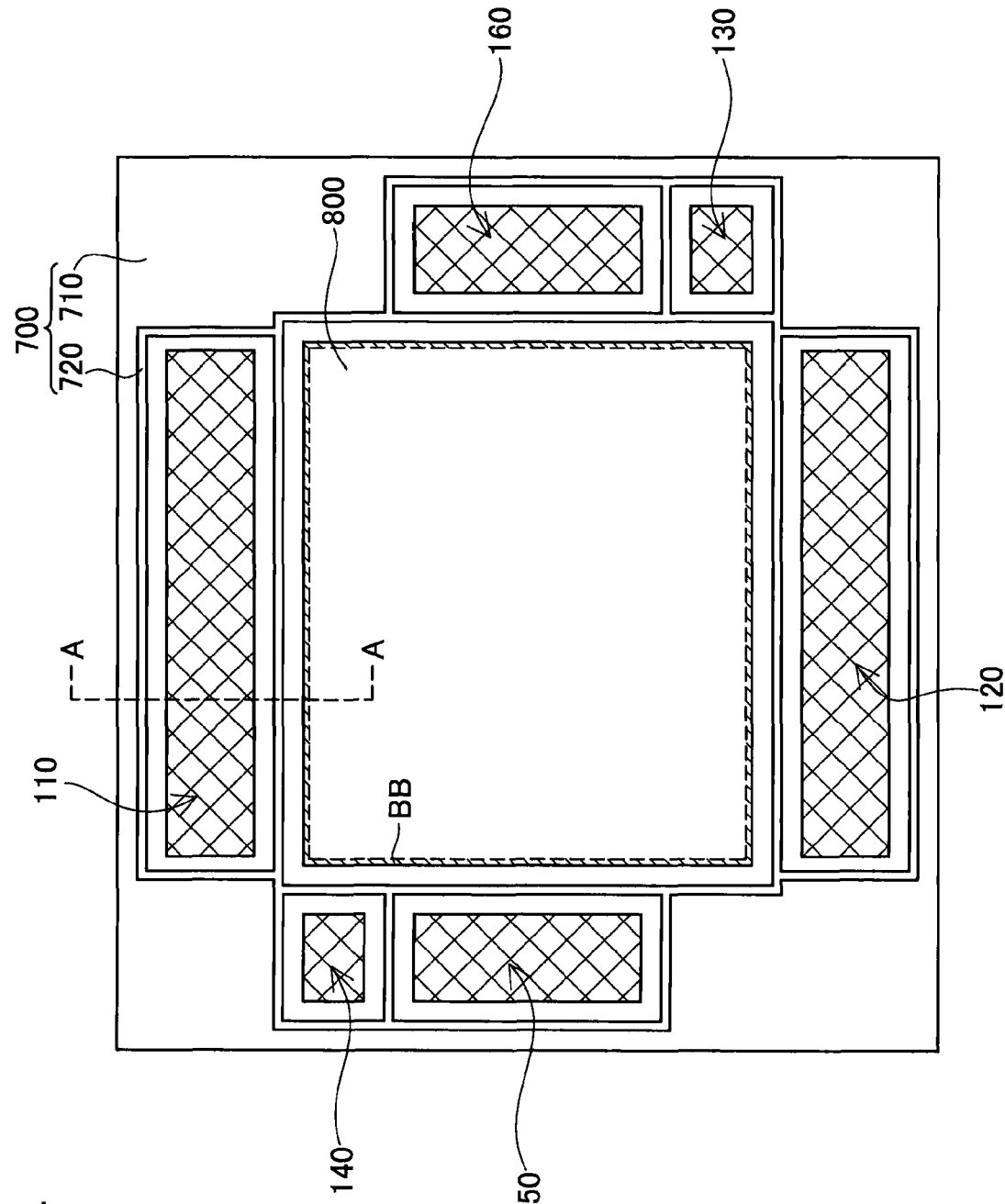
FIG. 4 is a front view of a unit cell assembly 200.
Figure 5:
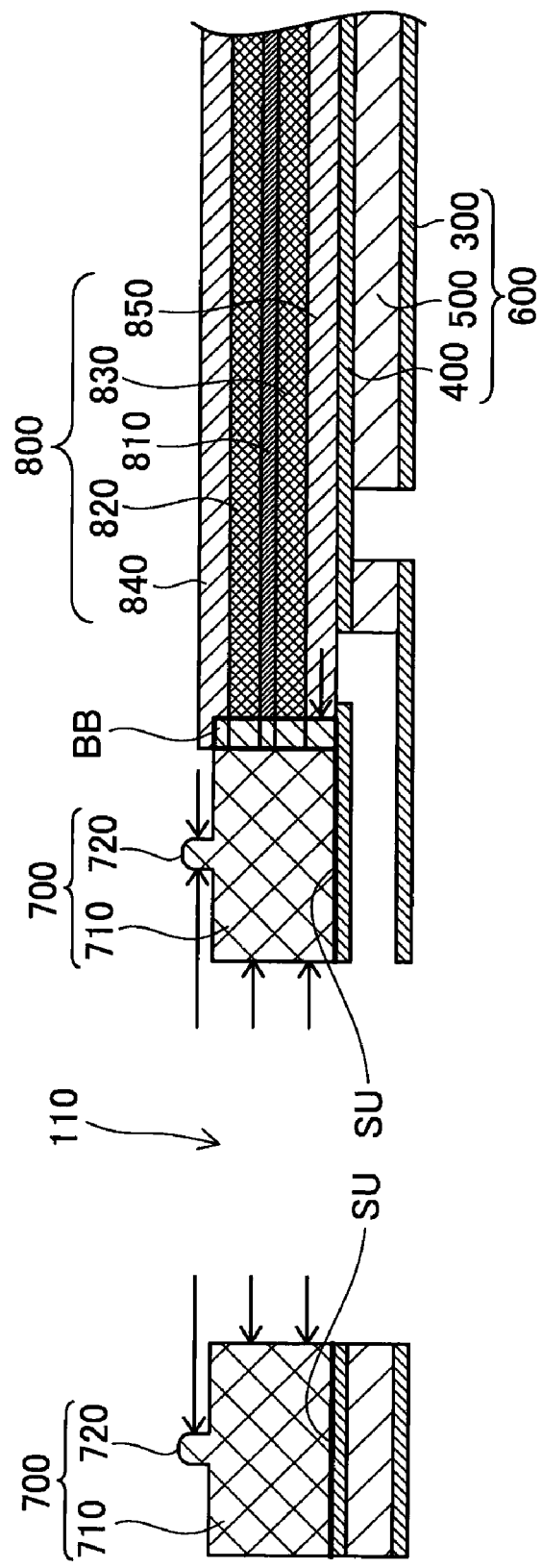
FIG. 5 is a sectional view showing the A-A cross section in FIG. 4.

The configuration of the unit cell assembly 200 will now be described making reference to FIGS. 4 and 5 in addition to FIG. 2. In FIG. 2, the unit cell assembly 200 is depicted in side view. FIG. 4 is a front view (seen from the right side in FIG. 2) of the unit cell assembly 200. FIG. 5 is a sectional view showing the A-A cross section in FIG. 4.

As shown in FIGS. 2, 4, and 5, the unit cell assembly 200 is constructed from a separator 600, a unit cell constituent member 800, and a seal member 700.

First, the configuration of the separator 600 will be described in brief. The separator 600 is composed of an anode plate 300, a cathode plate 400, and a middle plate 500.

Figure 6:
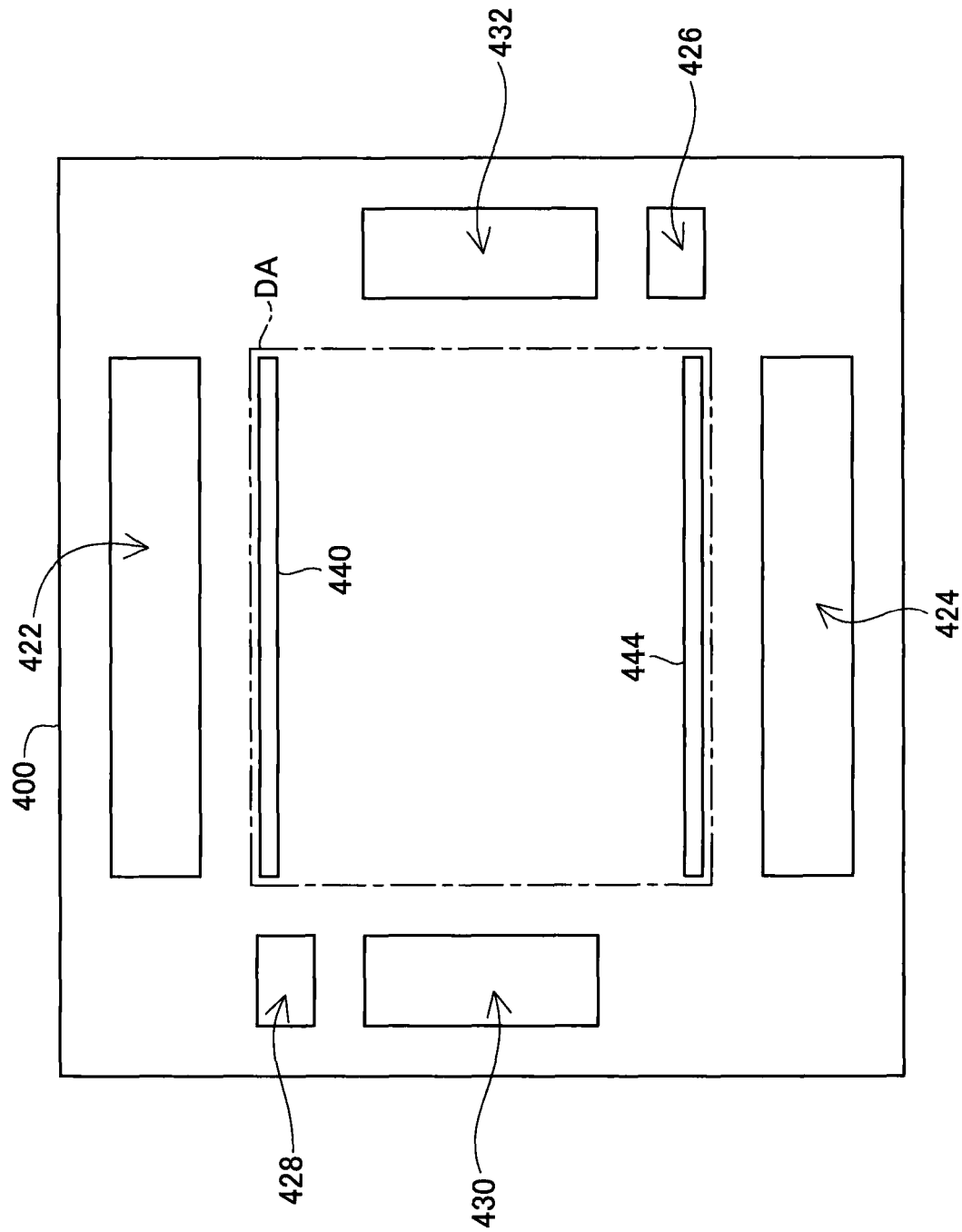
FIG. 6 is an illustration depicting the contours of a cathode plate.
Figure 7:
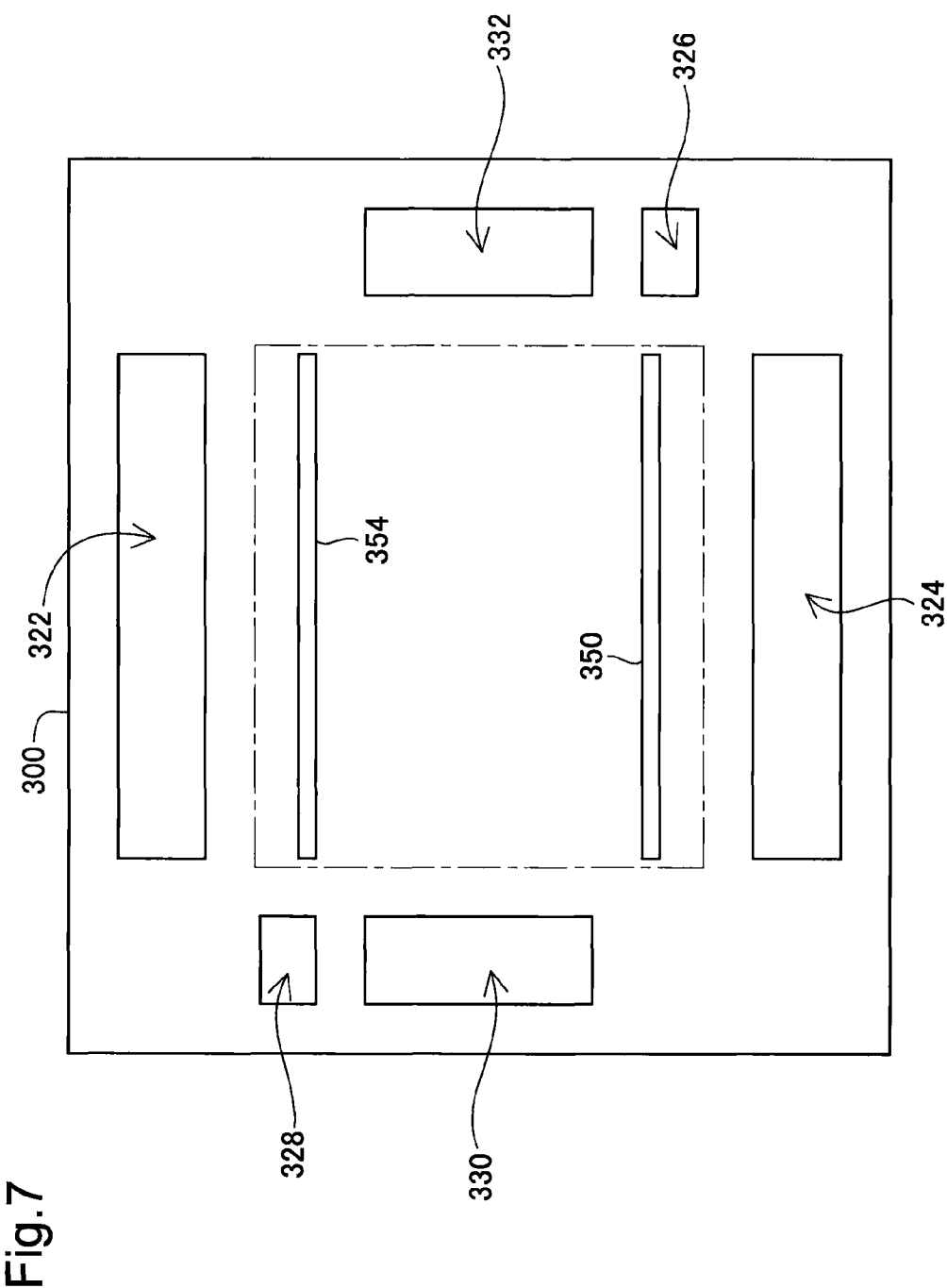
FIG. 7 is an illustration depicting the contours of an anode plate.
Figure 8:
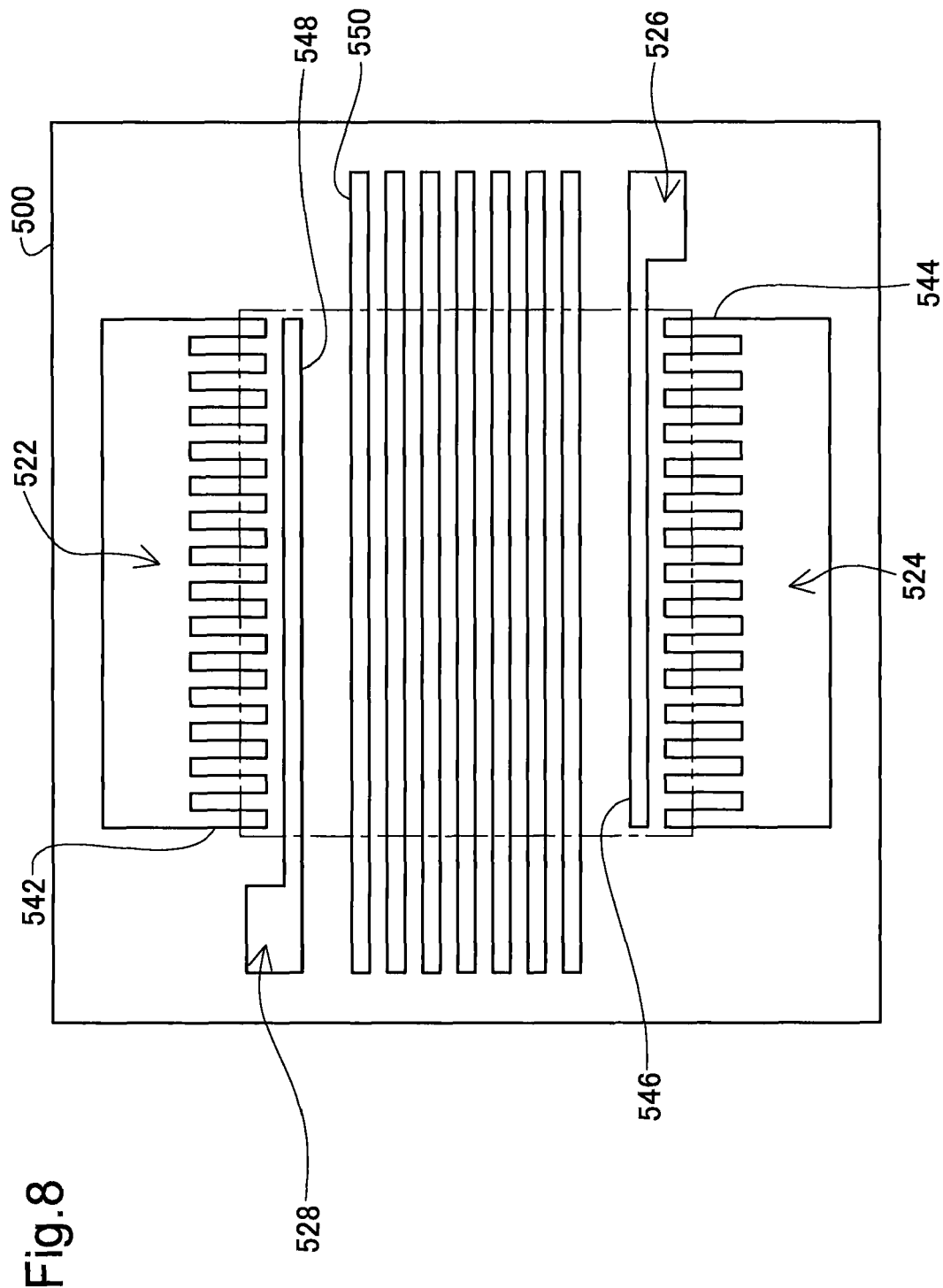
FIG. 8 is an illustration depicting the contours of a middle plate.

FIGS. 6 to 8 respectively depict the contours of the cathode plate 400 (FIG. 6), the anode plate 300 (FIG. 7), and the middle plate 500 (FIG. 8). FIGS. 6, 7, and 8 depict the plates 400, 300, 500 as seen from the right side in FIG. 2. In FIGS. 6 to 8, the area DA indicated by the broken lines in the center part of each plate 300, 400, 500 is the area in which the unit cell constituent member 800, described later, will be positioned in the unit cell assembly 200 (hereinafter, this area will be termed the electricity generating area DA).

The cathode plate 400 will be formed of stainless steel, for example. The cathode plate 400 is provided with six manifold openings 422 to 432, an oxidant gas supply slit 440, and an oxidant gas discharge slit 444. The manifold openings 422 to 432 are perforated such that they will be used to define the manifolds discussed above when constructing the fuel cell 100, and are disposed respectively to the outside of the electricity generating area DA. The oxidant gas supply slit 440 is situated at an edge of the electricity generating area DA (in FIG. 6, the upper edge). The oxidant gas discharge slit 444 is situated juxtaposed at another edge of the electricity generating area DA (in FIG. 6, the lower edge).

The anode plate 300, like the cathode plate 400, will be formed of stainless steel, for example. Like the cathode plate 400, the anode plate 300 is provided with six manifold openings 322 to 332, and with a fuel gas supply slit 350 and a fuel gas discharge slit 354. The manifold openings 322 to 332 are perforated such that they will be used to define the manifolds discussed above when constructing the fuel cell 100; as on the cathode plate 400 they will be disposed respectively to the outside of the electricity generating area DA. The fuel gas supply slit 350 is situated at the edge of the electricity generating area DA (in FIG. 7, the lower edge) in such a way that it will not overlap the oxidant gas discharge slit 444 of the cathode plate 400 in the assembled separator 600. The fuel gas discharge slit 354 is situated at the edge of the electricity generating area DA (in FIG. 7, the upper edge) in such a way that it will not overlap the oxidant gas supply slit 440 of the cathode plate 400 in the assembled separator 600.

The middle plate 500, like the plates 300, 400 discussed above, will also be formed of stainless steel, for example. The middle plate 500 is provided with four manifold openings 522, 524, 526, 528, each passing through the plate in the thickness direction, for supply/discharge of the reactant gases (oxidant gas or fuel gas); with supply channel openings 542, 546, and with discharge channel openings 544, 548. The middle plate 500 is additionally provided with a plurality of cooling medium channel openings 550. The manifold openings 522 to 528 are perforated such that they will be used to define the manifolds discussed above when constructing the fuel cell 100; as in the cathode plate 400 and the anode plate 300 they will be disposed respectively to the outside of the electricity generating area DA.

The cooling medium channel openings 550 have oblong shape that traverses the electricity generating area DA in the left-right direction in FIG. 8, with their ends extending to the outside of the electricity generating area DA. The cooling medium channel openings 550 are arrayed at prescribed spacing in the vertical direction in FIG. 8.

The reactant gas supply channel openings 542, 546 and discharge channel openings 544, 548 respectively communicate at their one end with the corresponding manifold openings 522, 526, 524, 528. The channel openings 546, 548, 542, 544 respectively communicate at their other end with the corresponding supply/discharge slits 350, 354, 440, 444 when the three plates are joined.

Figure 9:
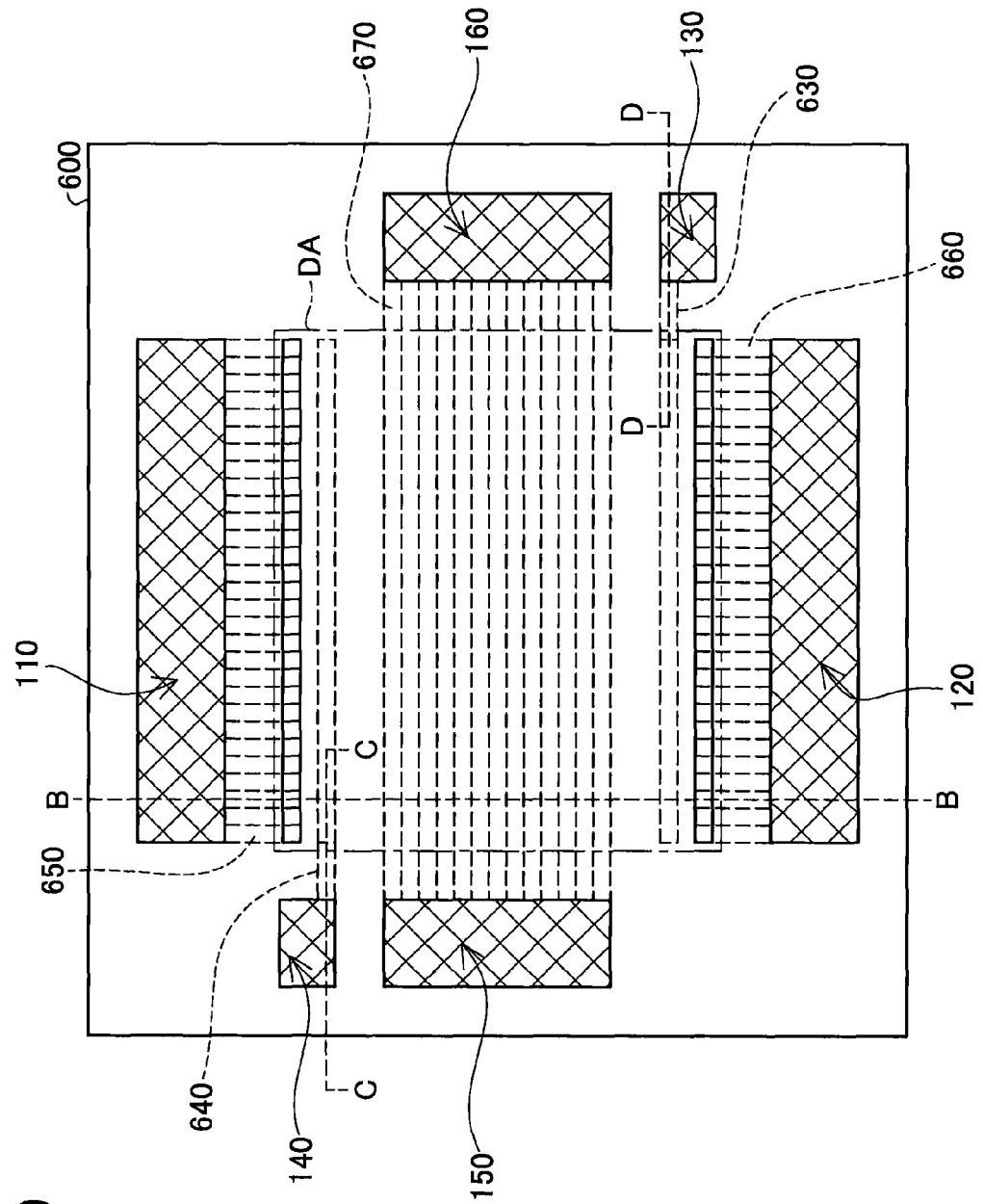
FIG. 9 is a front view of a separator.

FIG. 9 is a front view of the separator. The separator 600 is produced by bonding the anode plate 300 and cathode plate 400 to either side of the middle plate 500 so as to sandwich the middle plate 500; and then punching out the sections in the middle plate 500 that lie exposed in the areas corresponding to the cooling medium supply manifold 150 and the cooling medium discharge manifold 160. Exemplary methods for bonding the plates include thermocompression bonding, soldering, or welding. As a result, there will be obtained a separator 600 having the perforated parts indicated by hatching in FIG. 9, namely, the six manifolds 110 to 160, as well as an oxidant gas supply channel 650, an oxidant gas discharge channel 660, a fuel gas supply channel 630, a fuel gas discharge channel 640, and a cooling medium channel 670.

The description of the unit cell assembly 200 continues, referring back to FIGS. 2, 4, and 5. As depicted in FIG. 2, the unit cell constituent member 800 is positioned in the electricity generating area DA on the face of the cathode plate 400 of the separator 600; and the seal member 700 is positioned in an area outside the electricity generating area DA on the same face (hereinafter termed the surrounding area). As shown in FIG. 5, the unit cell constituent member 800 is composed of an MEA (Membrane Electrode Assembly) 810; an anode-side diffusion layer 820 positioned contacting the anode-side face of the MEA 810; a cathode-side diffusion layer 830 positioned contacting the cathode-side face of the MEA 810; an anode-side porous body 840; and a cathode-side porous body 850. The anode-side porous body 840 is positioned over the anode-side diffusion layer 820 on the anode side of the MEA 810, while the cathode-side porous body 850 is positioned over the cathode-side diffusion layer 830 on the cathode side of the MEA 810. The cathode-side porous body 850 is in contact with the electricity generating area DA of the separator 600. With a plurality of the unit cell assemblies 200 stacked to produce the fuel cell 100, the anode-side porous body 840 will be disposed contacting the anode plate 300 side of the separator 600 of the neighboring unit cell assembly 200.

The MEA 810 is composed of an ion exchange membrane made, for example, of fluororesin material or hydrocarbon resin material having good ion conductivity in the wetted state, and catalyst layers that have been applied to both sides of the membrane. The catalyst layers contain platinum, or an alloy of platinum with another metal, for example.

The anode-side diffusion layer 820 and the cathode-side diffusion layer 830 are made of carbon cloth woven from carbon fiber yarn, or carbon paper or carbon felt for example.

The anode-side porous body 840 and the cathode-side porous body 850 are made of porous material having gas diffusion ability and electrical conductivity, such as a porous metal body. The anode-side porous body 840 and the cathode-side porous body 850 will have higher void volume than do the anode-side diffusion layer 820 and the cathode-side diffusion layer 830 mentioned above, as well as internal gas flow resistance that is lower than that of the anode-side diffusion layer 820 and the cathode-side diffusion layer 830; they function as channels for flow of the reactant gases, discussed later.

The seal member 700 is provided with a support part 710, and a rib 720 formed on the upper face of the support part 710. The seal member 700 is made of a material that is gas impermeable, and that has resilience and heat resistance in the operating temperature range of the fuel cell; for example, an elastic material such as a rubber or elastomer. Specific examples of materials that can be used are silicone rubber, butyl rubber, acrylic rubber, natural rubber, fluororubber, ethylene/propylene rubber, styrene elastomers, fluoroelastomers, and so on.

The support part 710 of the seal member 700 is disposed contacting the entire surrounding area of the cathode plate 400 side of the separator 600, discussed above (FIGS. 2, 5). The support part 710 of the seal member 700 is adhered with prescribed bond strength to the cathode plate 400 side of the separator 600 at their contact face SU (indicated by the heavy line in FIG. 5).

Herein, this prescribed bond strength refers to bond strength with the unit cell assembly 200 in the unstacked/unfastened state, i.e. in the absence of applied load in the stacking direction. The prescribed bond strength will be such that, when the seal member 700 is subjected to estimated fluid pressures that will be applied during operation of the fuel cell as depicted by the arrows in FIG. 5, the bond strength is sufficient to prevent the seal member 700 from shifting out of place in the direction along the contact face SU with respect the cathode plate 400 side of the separator 600. The estimated fluid pressures during operation of the fuel cell may include fuel gas pressure, oxidant gas pressure, and cooling medium pressure inside the manifolds 110 to 160, as well as the pressure of the oxidant gas supplied to the cathode-side diffusion layer 830 and to the cathode-side porous body 850, and the pressure of the fuel gas supplied to the anode-side diffusion layer 820 and to the anode-side porous body 840.

In preferred practice, the prescribed bond strength will be determined on the basis of an estimated maximum fluid pressure. For example, the higher the load at which a fuel cell is operated, the higher the pressure of the oxidant gas, the fuel gas, and the cooling medium will be. Moreover, as pressure losses occur when a fluid flows, pressure at the upstream end of a flow passage (the inlet side) will be higher than pressure at the downstream end (the outlet side). Moreover, where air is employed as the oxidant gas, since air contains only about 20% oxygen (which is consumed in the electrochemical reaction), in many instances the oxidant gas must be delivered at high pressure to ensure a sufficient supply of oxygen to the cathode. Additionally, where the flow of oxidant gas is employed for the purpose of expelling evolved water to the outside, in many instances the oxidant gas will be delivered at high pressure in order to efficiently expel evolved water. Accordingly, in such instances, the bond strength at the contact face SU will be determined on the basis of a pressure at the upstream side of the oxidant gas flow passage (in proximity to the oxidant gas supply manifold 110) at high load operation, so as to avoid shifting thereof at this pressure level.

Specifically, the bond strength at the contact face SU will preferably be at least 0.01 N/mm (Newtons per millimeter), more preferably 0.6 N/mm or more, per unit length of the seal line.

As shown by symbol BB in FIG. 4 and FIG. 5, the support part 710 impregnates into and is unified with the edge portion of the unit cell constituent member 800. Thus, leakage of reactant gas from the cathode side to the anode side, or from the anode side to the cathode side, of the MEA 810 will be prevented at the edge portion of the unit cell constituent member 800.

As depicted in FIG. 4, the rib 720 is formed so as to surround the unit cell constituent member 800 and the manifolds 110 to 160 respectively. When the unit cell assemblies 200 are stacked to construct the fuel cell 100, the rib 720 will be disposed in gastight contact against the anode plate 300 of the separator 600 of the neighboring unit cell assembly 200, through fastening force in the stacking direction.

As will be understood from the preceding description, with the unit cell assemblies 200 stacked to produce the fuel cell 100, the seal member 700, by means of the contact face SU of its support part 710, will seal with the separator 600 of that unit cell assembly 200; and by means of its rib 720 will seal with the adjacent unit cell assembly 200. Thus, the fuel gas, the oxidant gas, and the cooling medium will be prevented from leaking out from the fuel cell, or mixing with one another.

Fuel Cell Operation

Operation of the fuel cell 100 according to the embodiment will now be described with reference to FIGS. 10A and 10B. FIGS. 10A and 10B illustrate flows of reactant gas in a fuel cell. In FIGS. 10A and 10B, in order to simplify the illustration, two unit cell assemblies 200 are shown stacked. FIG. 10A depicts a sectional view corresponding to the B-B cross section in FIG. 9. In FIG. 10B, the right half depicts a sectional view corresponding to the D-D cross section in FIG. 9, while the left half depicts a sectional view corresponding to the C-C cross section in FIG. 9.

In the fuel cell 100, electricity is generated by supplying oxidant gas to the oxidant gas supply manifold 110 while also supplying fuel gas to the fuel gas supply manifold 130. During generation by the fuel cell 100, the cooling medium supply manifold 150 will be supplied with a cooling medium for the purpose of limiting the rise in temperature of the fuel cell produced by heat evolved in association with generation of electricity.

Oxidant gas that has been supplied to the oxidant gas supply manifold 110 is supplied from the oxidant gas supply manifold 110 to the cathode-side porous body 850 through the oxidant gas supply channel 650, as depicted by the arrows in FIG. 10A. The oxidant gas supply channel 650 is defined by the oxidant gas supply channel opening 542 (FIG. 8) made in the middle plate 500 and by the oxidant gas supply slit 440 (FIG. 6) made in the cathode plate 400 discussed earlier. The oxidant gas which has been supplied to the cathode-side porous body 850 will now flow inside the cathode-side porous body 850 (which functions as a channel for the oxidant gas) from the upper to lower side in FIGS. 4 and 9. The oxidant gas will then pass through the oxidant gas discharge channel 660 to be discharged into the oxidant gas discharge manifold 120. The oxidant gas discharge channel 660 is defined by the oxidant gas discharge channel opening 544 (FIG. 8) made in the middle plate 500 and by the oxidant gas discharge slit 444 (FIG. 6) made in the cathode plate 400 discussed earlier. Some of the oxidant gas flowing through the cathode-side porous body 850 will diffuse along the entirety of the cathode-side diffusion layer 830 which contacts the cathode-side porous body 850, and will participate in the cathode reaction (e.g. $2H^+ + 2e^- + (1/2)O_2 \rightarrow H_2O$).

Fuel gas that has been supplied to the fuel gas supply manifold 130 is supplied from the fuel gas fuel manifold 130 to the anode-side porous body 840 through the fuel gas supply channel 630, as depicted by the arrows in FIG. 10B. The fuel gas supply channel 630 is defined by the fuel gas supply channel opening 546 (FIG. 8) made in the middle plate 500 and by the fuel gas supply slit 350 (FIG. 7) made in the anode plate 300 discussed earlier. The fuel gas which has been supplied to the anode-side porous body 840 will now flow inside the anode-side porous body 840 (which functions as a channel for the fuel gas) from the lower to upper side in FIGS. 4 and 9. The fuel gas will then pass through the fuel gas discharge channel 640 to be discharged into the fuel gas discharge manifold 140. The fuel gas discharge channel 640 is defined by the fuel gas discharge channel opening 548 (FIG. 8) made in the middle plate 500 and by the fuel gas discharge slit 354 (FIG. 7) made in the anode plate 300 discussed earlier. Some of the oxidant gas flowing through the anode-side porous body 840 will diffuse along the entirety of the anode-side diffusion layer 820 which contacts the anode-side porous body 840, and will participate in the anode reaction (e.g. $H_2 \rightarrow 2H^+ + 2e^-$).

The cooling medium that has been supplied to the cooling medium supply manifold 150 is supplied from the cooling medium supply manifold 150 to the cooling medium channel 670. As depicted in FIG. 9, the cooling medium channel 670 is defined by the cooling medium channel openings 550 (FIG. 8) made in the middle plate 500 discussed earlier, and communicates at one end with the cooling medium supply manifold 150 and at the other end with the cooling medium discharge manifold 160. The cooling medium that has been supplied to the cooling medium channel 670 will flow from one end of the cooling medium channel 670 to the other, and be discharged into the cooling medium discharge manifold 160.

Figure 11:
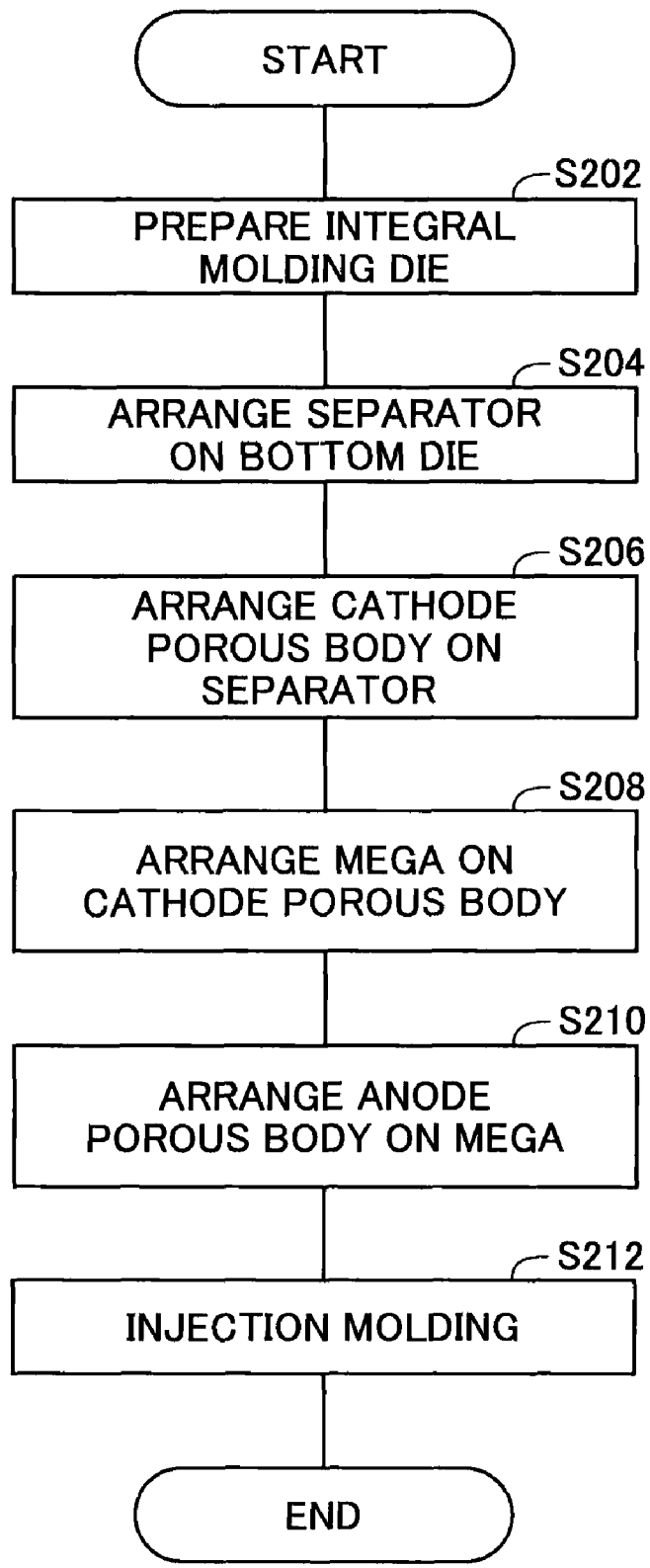
FIG. 11 is a flowchart depicting manufacturing steps of a unit cell assembly in an embodiment.
Figure 12A:
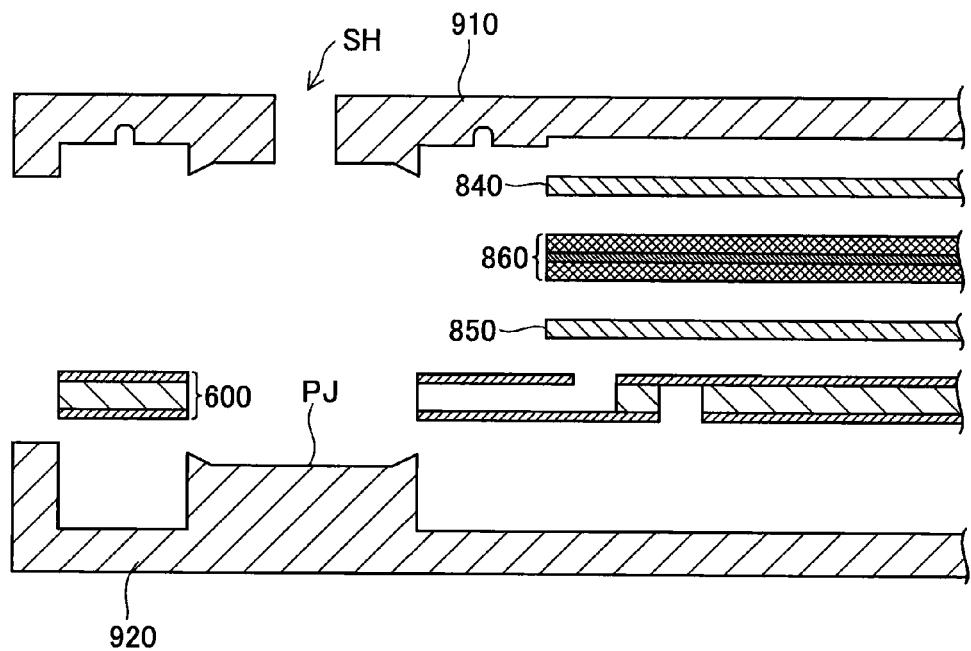
FIGS. 12A and 12B illustrate manufacturing steps of a unit cell assembly in an embodiment.
Figure 12B:
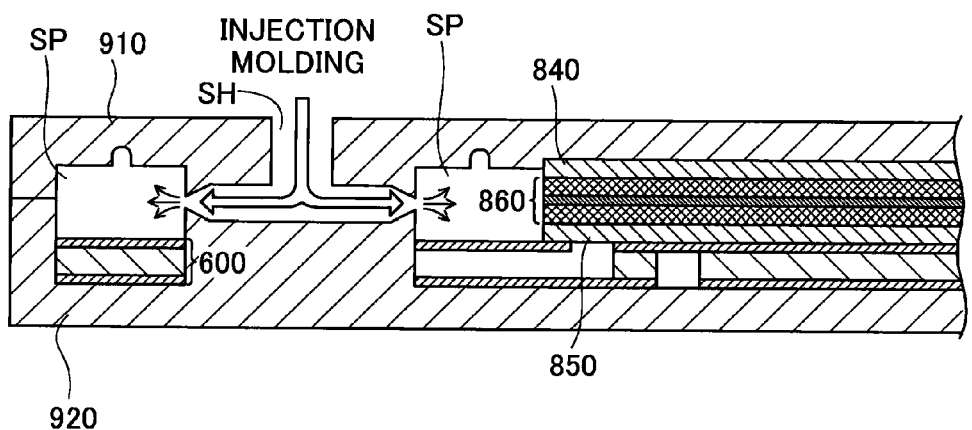
Figure 13:
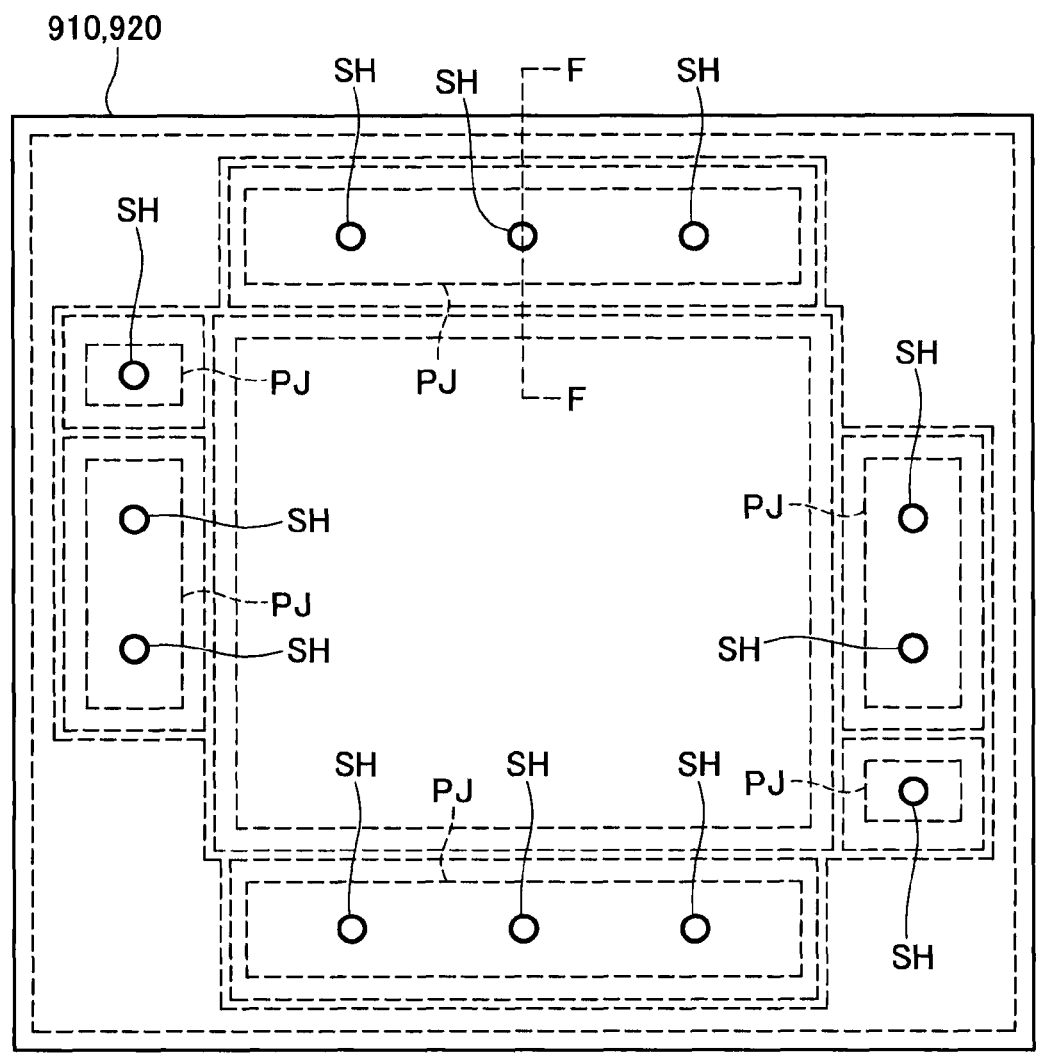
FIG. 13 is a diagram of a molding die.

Unit Cell Assembly Manufacturing Method:

A method of manufacturing the unit cell assembly 200 having the configuration discussed above will be described with reference to FIGS. 11, 12A and 12B. FIG. 11 is a flowchart depicting manufacturing steps of a unit cell assembly in the embodiment. FIGS. 12A and 12B illustrate manufacturing steps of a unit cell assembly in the embodiment. FIG. 13 is a diagram of a molding die. FIGS. 12A and 12B show the F-F cross section in FIG. 13.

First, a molding die for integral molding is prepared (Step S202). As depicted in FIG. 12A, the molding die has a top die 910 and a bottom die 920. As shown in FIGS. 12A, 12B and 13, the bottom die 920 has a shape that conforms to the contours of the separator 600 so that the separator 600 will be positioned therein. Also, as shown in FIGS. 12A, 12B and 13, the bottom die 920 is provided with projecting parts PJ adapted to fit into the manifolds of the separator 600 when the separator 600 is positioned thereon. The top die 910 is provided with injection ports SH for the molding material, situated above the projecting parts PJ of the bottom die.

Next, the separator 600 is positioned on the bottom die (Step S204). In the present embodiment, the separator 600 is positioned on the bottom mold 920, with its anode plate 300 side facing down and its cathode plate 400 side facing up.

Next, the cathode-side porous body 850 is positioned on the separator 600 which has been positioned on the bottom die 920 (Step S206). The cathode-side porous body 850 will be positioned in the electricity generating area DA (FIG. 6 etc.) on the cathode plate 400 face of the separator 600.

A MEGA 860 is then positioned overlapping the thusly positioned cathode-side porous body 850 (Step S208). The MEGA 860 is an integrated assembly in which the anode-side diffusion layer 820 and the cathode-side diffusion layer 830 have been adhered beforehand to the either side of the MEA 810 by hot pressing.

The anode-side porous body 840 is then positioned overlapping the thusly positioned MEGA 860 (Step S210).

Once all parts of the unit cell constituent member 800 have been positioned in the electricity generating area DA of the separator 600 in this way, the dies are locked at prescribed die pressure, and injection molding is carried out (Step S212). The bottom die 920 and the top die 910 are depicted in the locked state in FIG. 12B. In the locked state, spaces SP having the shape of the seal member 700 of the unit cell assembly 200 described earlier will form to the upper side of the surrounding area (the area outside the electricity generating area DA) on the cathode plate 400 side of the separator 600. As shown in FIG. 12B, these spaces SP are defined by the face on the cathode plate 400 side of the separator 600, the inside wall faces of the bottom die 920 and the top die 910, and the edge portion of the unit cell constituent member 800 (the anode-side porous body 840, the MEGA 860, and the cathode-side porous body 850). Injection molding takes place within these spaces SP. Specifically, once a liquid rubber used as the molding material of the seal member 700 has been injected from the injection ports SH, a vulcanization process is carried out.

During injection molding, the injection pressure of the molding material is controlled such that the molding material will impregnate into the edge portion of the unit cell constituent member 800 (the area BB in FIG. 4 and FIG. 5) so that the unit cell constituent member 800 and the seal member 700 become unified. Bond strength at the contact face SU (FIG. 5) of the seal member 700 with the separator 60 will be ensured through addition of a silane coupling agent to the molding material. After injection molding, the dies are parted to obtain the unit cell assembly 200.

According to the present embodiment described above, unit cell assemblies 200 composed of the unified seal member 700, separator 600, and unit cell constituent member 800 is produced, and the unit cell assemblies 200 are then stacked and fastened to produce the fuel cell 100. Thus, ease of assembly of the fuel cell 100 will be improved, and the number of manufacturing steps will be reduced.

Figure 14:
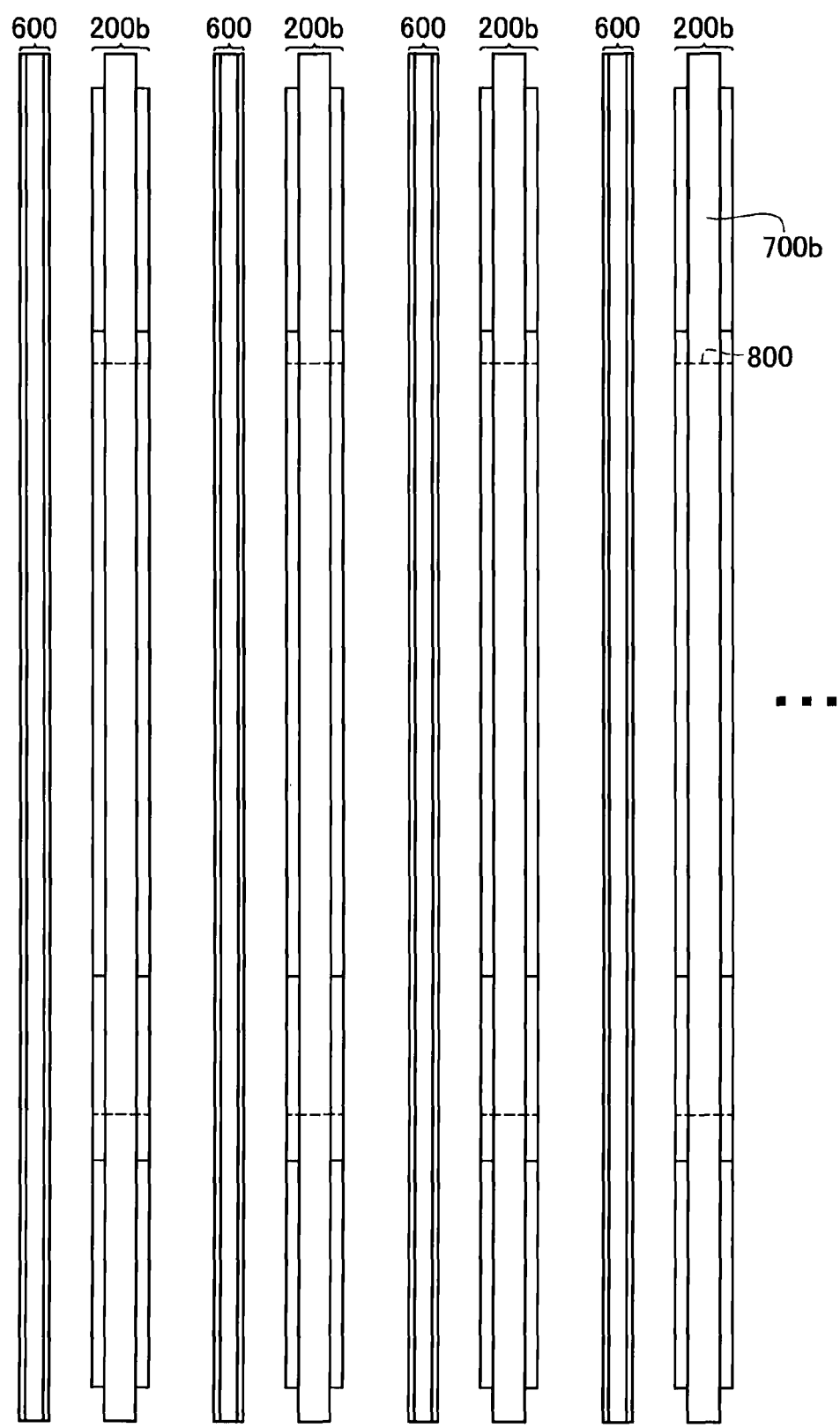
FIG. 14 is a first diagram of an exemplary conventional fuel cell.
Figure 15:
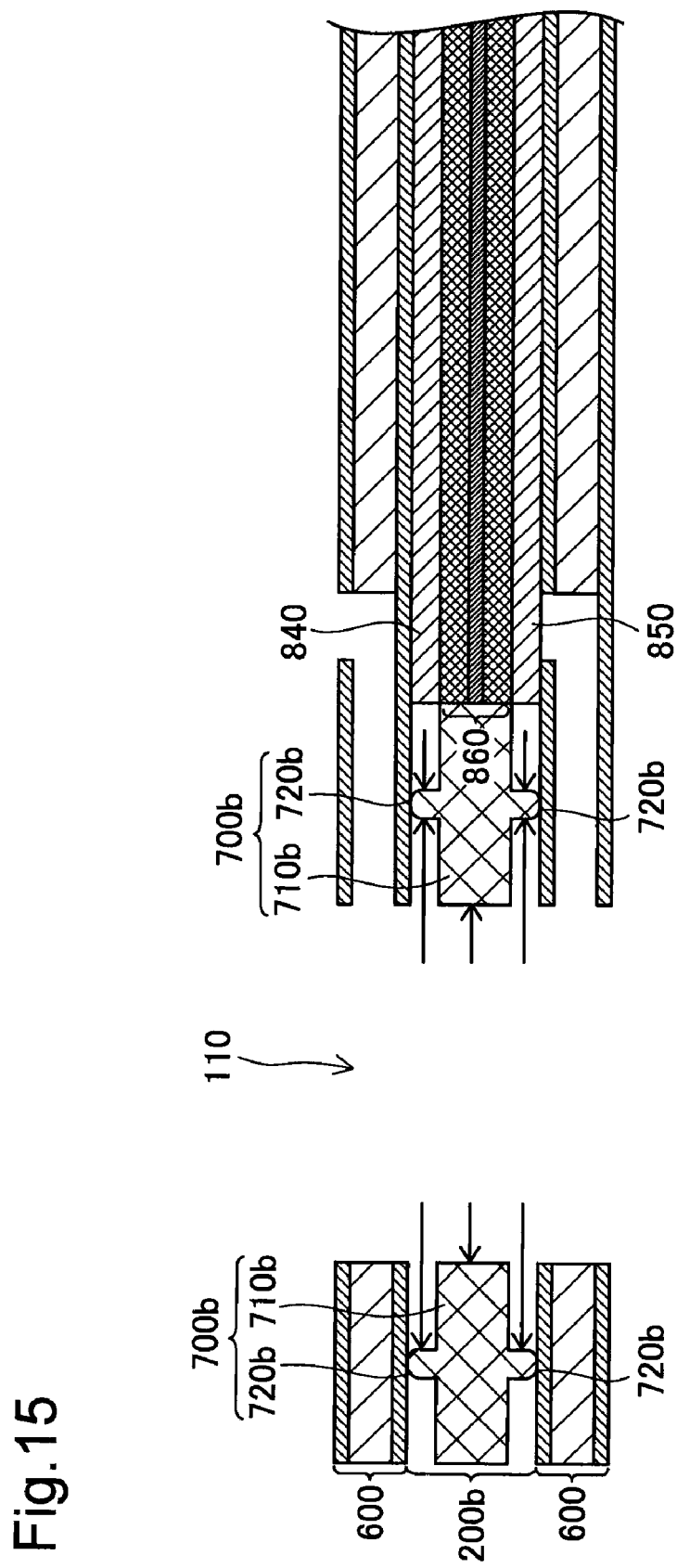
FIG. 15 is a second diagram of an exemplary conventional fuel cell.

As an aid to understanding, an example of a conventional fuel cell will be described making reference to FIGS. 14 and 15. As depicted in FIG. 14, in a conventional fuel cell, separators 600 and integrally sealed type unit cells 200b are stacked in alternating fashion, for example. As depicted in FIG. 15, the integrally sealed-type unit cells 200b are components in which a seal member 700b has been integrally molded with the edge portion of the unit cell constituent member 800 (the anode-side porous body 840, the MEGA 860, and the cathode-side porous body 850) through a process such as injection molding. With this design, in order to construct for example a fuel cell that includes one hundred of unit cells, it would be necessary to stack one hundred of the separators 600 and one hundred of the integrally sealed type unit cells 200b, for a total of 200 layers. According to the present embodiment described above on the other hand, since it is sufficient simply to stack one hundred of the unit cell assemblies 200, the number of manufacturing steps will be fewer. Moreover, the seal members are made of relatively pliable elastic material so as to enable them to conform to flexure of the fuel cell in order to ensure good sealing, and therefore with a construction like that of the integrally sealed type unit cells 200b the seal members 700b may experience deformation during stacking and fastening, making it difficult to assemble them with good accuracy. In the present embodiment however, the seal members 700 are in planar contact with the highly rigid separators 600 and its shape is supported, thereby limiting deformation of the seal members 700 during stacking and fastening, so that accurate assembly is achieved.

Furthermore, according to the present embodiment, the fastening force in the stacking direction of the fuel cell 100 can be lower. As a result, the fastening components employed to fasten the fuel cell 100 in the stacking direction can be smaller, the separators 600 can be thinner, and the fuel cell 100 can be given longer life.

In the conventional configuration depicted in FIGS. 14 and 15, ribs 720$b$ are formed on both sides (i.e. the anode side and the cathode side) of the seal member 700$b$ in the integrally sealed type unit cell 200$b$, and sealing between the seal member 700$b$ and the separator 600 is ensured through contact of the ribs 720$b$ with the separators 600 to both sides. In such instances, when the seal member 700$b$ is subjected to fluid pressures experienced during operation of the fuel cell as depicted by the arrows in FIG. 15, the only force resisting this load will be static frictional force between the ribs 720$b$ with the separators 600. Since the magnitude of static frictional force is proportional to the fastening force load in the stacking direction, a relatively high fastening force load is necessary in order to limit shifting of the seal members 700 due to the fluid pressures experienced during operation of the fuel cell. Shifting of seal members 700 due to the fluid pressures experienced during operation of the fuel cell can create a defective seal, and needs to be prevented.

In the present embodiment, as noted previously, the contact face SU of the seal member 700 with the separator 600 has bond strength sufficient to withstand the fluid pressures experienced during operation of the fuel cell, even in the absence of load in the stacking direction. Consequently, the fastening force in the stacking direction of the fuel cell 100 can be established exclusively with consideration to ensuring a good seal between the rib 720 and the separator 600, without giving any consideration to limiting shifting of the seal members 700. As a result, fastening force in the stacking direction of the fuel cell 100 may be appreciably less than the conventional ones.

Moreover, as noted, in the present embodiment, whereas between the cathode side of the seal member 700 and one separator 600 there exists bond strength sufficient to limit shifting of the seal members 700 due to the fluid pressures experienced during operation of the fuel cell, another separator 600 and the anode side of the seal member 700 are simply disposed in contact via the rib 720. That is, the bond strength between the cathode side of the seal member 700 and the one separator 600 will be appreciably greater than the bond strength between the anode side of the seal member 700 and the another separator 600. As a result, when the stacked fuel cell 100 is to be disassembled, this other separator 600 and the anode side of the seal member 700 will be separated easily. Consequently, disassembly into unit cell assembly 200 units will be an easy matter, so that for example unit cells that have malfunctioned can be replaced in unit cell assembly 200 units, improving the ease of maintenance. Since the seal member 700 is integrally formed as a single layer on one side of the separator 600, ease of disassembly is improved.

B. MODIFIED EMBODIMENTS

Modified Embodiment 1

Figure 16:
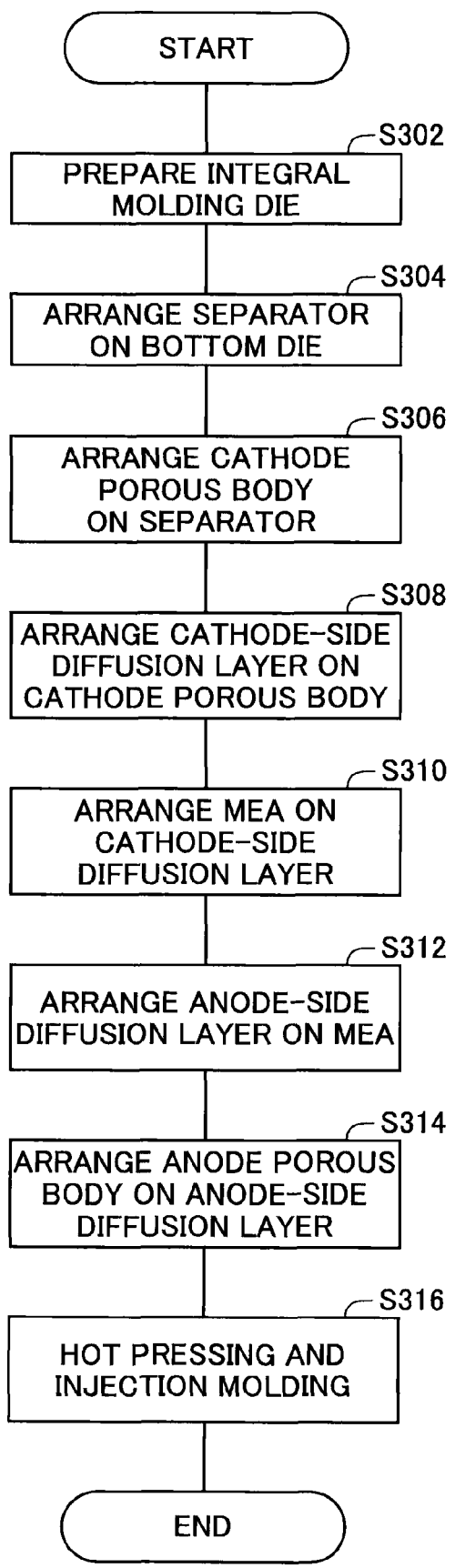
FIG. 16 is a flowchart depicting manufacturing steps of a unit cell assembly in Modified Embodiment 1.
Figure 17A:
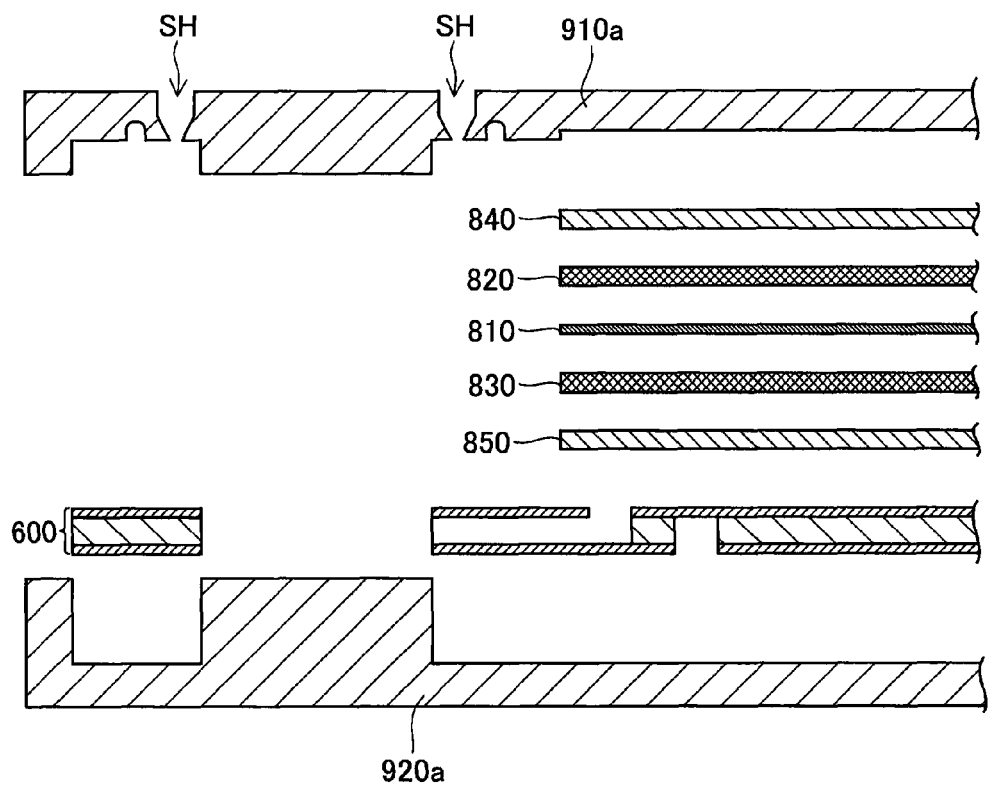
FIGS. 17A and 17B illustrate manufacturing steps of a unit cell assembly in Modified Embodiment 1.
Figure 17B:
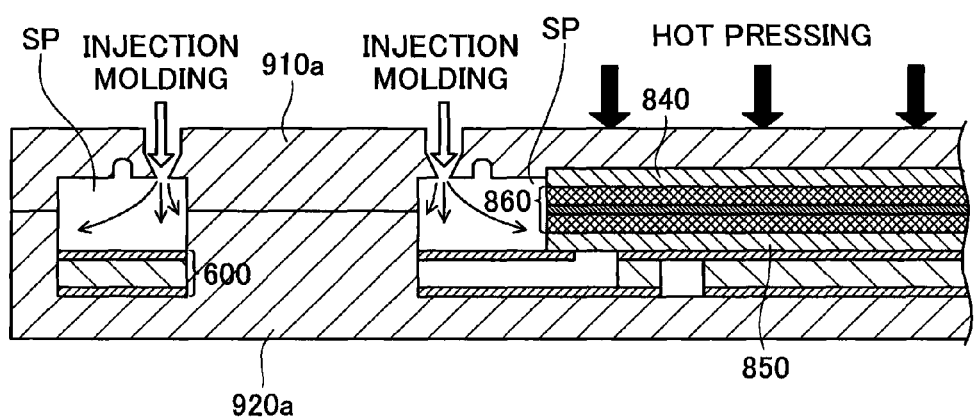

A modified embodiment of the method of manufacturing the unit cell constituent member 200 will be described by way of Modified Embodiment 1, with reference to FIGS. 16, 17A and 17B. FIG. 16 is a flowchart depicting manufacturing steps of a unit cell assembly in Modified Embodiment 1. FIGS. 17A and 17B illustrate manufacturing steps of a unit cell assembly in Modified Embodiment 1.

Step S302 to Step S306 of the method of manufacturing the unit cell constituent member 200 of Modified Embodiment 1 are similar to Steps S202 to 206 (FIG. 11) of the method of manufacturing the unit cell constituent member 200 of the embodiment described previously.

In the method of manufacturing the unit cell constituent member 200 of Modified Embodiment 1, in a point of difference from the method of manufacturing the unit cell constituent member 200 of the Embodiment, the MEA 810, the anode-side diffusion layer 820, and the cathode-side diffusion layer 830 have not been prepared as a MEGA 860 through hot pressing beforehand, but are rather respectively prepared as separate elements as shown in FIG. 17A.

Then, the cathode-side diffusion layer 830 is arranged over the cathode-side porous body 850 that was arranged in Step S306 (Step S308); the MEA 810 is arranged over the cathode-side diffusion layer 830 (Step S310); and the anode-side diffusion layer 820 is arranged over the MEA 810 (Step S312). Finally, as in the embodiment, the anode-side porous body 840 is arranged over the anode-side diffusion layer 820 (Step S314).

Once all parts of the unit cell constituent member 800 have been arranged in the electricity generating area DA of the separator 600, the dies are locked under prescribed die pressure, and injection molding, accompanied by hot pressing, is carried out (Step S316, FIG. 17B). As a result, in this step, the anode-side diffusion layer 820 and the cathode-side diffusion layer 830 will be respectively adhered to either side of the MEA 810, forming the MEGA 860. Where for example the vulcanization step in the injection molding process is carried out by heating the molding die, the heat can be utilized for hot pressing.

According to the method of manufacturing the unit cell assembly 200 of Modified Embodiment 1, hot pressing is carried out concomitantly with molding of the seal member 700, thereby eliminating the step of producing the MEGA 860 through hot pressing beforehand. Here, concomitant injection molding and hot pressing refers to situations where hot pressing is carried out during any of the series of injection molding steps from locking of the die to parting of the die, and does not necessarily mean that hot pressing must take place simultaneously with charging (injection) of the molding material from the injection ports SH.

In contrast to the Embodiment, in the top die 910$a$ of the molding die depicted in FIG. 17A, the injection ports SH are situated above the spaces SP for molding the seal member 700, not in the regions corresponding to the manifolds 110 to 160. It will therefore be appreciated that various modifications of the specifications of the molding die are possible; and that the number, shape, dimensions etc. of the injection ports SH may be determined appropriately according to molding conditions such as the type of molding material, the injection pressure, the shape of the seal member 700, and so on. For example, the injection ports SH may be provided to the bottom die, or to both the top die and the bottom die.

Modified Embodiment 2

In the Embodiment above, bond strength at the contact face SU (FIG. 5) of the seal member 700 and the separator 600 is ensured through addition of a silane coupling agent to the seal member 700. However, bond strength at the contact face may be ensured by any of various other methods as well. For example, it is possible to utilize chemical bonding, e.g. molecular attraction, covalent bonding, hydrogen bonding or the like, or physical bonding such as mechanical bonding. More specifically, for chemical bonding, besides the silane coupling agent employed in the Embodiment it is possible to use a primer treatment, or epoxy-based or various other kinds of adhesives. Primer treatments and adhesives may be added to the molding material, or applied onto the separator 600. For physical bonding, it is possible to utilize a suction disk effect created by positioning the contact faces SU of the seal member 700 and the separator 600 in intimate contact and creating a vacuum.

Figure 18:
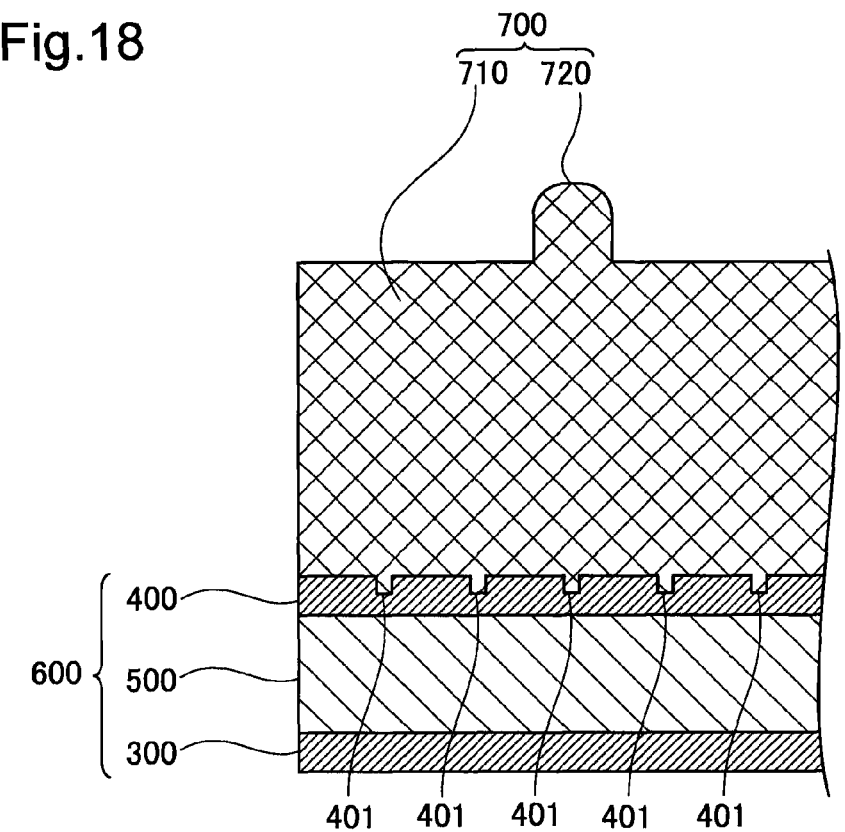
FIG. 18 is an enlarged view depicting contacting portions of a seal member and a separator in Modified Embodiment 2.

An example of such physical bonding is depicted in FIG. 18 as Modified Embodiment 2. FIG. 18 is an enlarged view depicting contacting portions of a seal member and a separator in Modified Embodiment 2. In Modified Embodiment 2, prior to fabricating the unit cell assembly 200 through injection molding as described above, grooves 401 are formed in the surrounding area on the cathode plate 400 side of the separator 600 (FIG. 18). The grooves 401 may be produced, for example, through an inscribing or cutting process.

Injection molding is then carried out in the manner described previously (FIGS. 11, 12), and when the seal member 700 is formed, the molding material will infiltrate into the grooves 401 so that the contacting portions of the seal member 700 and the separator 600 are bonded through the resultant anchoring effect.

The surface of the separator 600 may be provided with a shape such as holes instead of grooves; with a high degree of surface roughness over the entire face; or with projections or the like.

Modified Embodiment 3

Figure 19:
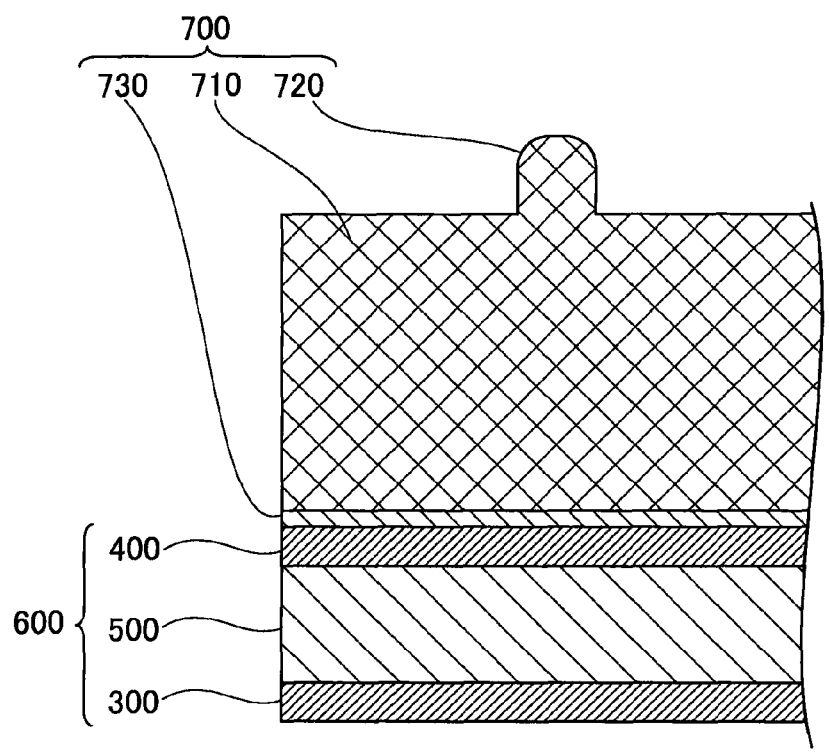
FIG. 19 is an enlarged view depicting contacting portions of a seal member and a separator in Modified Embodiment 3.

FIG. 19 is an enlarged view depicting contacting portions of a seal member and a separator in Modified Embodiment 3. The support part 710 and the separator 600 are adhered together via an adhesive layer 730 provided between them. For example, where support part 710 and the separator 600 have substantially poor adhesive affinity, the support part 710 and the separator 600 may be adhered through the agency of such a separate layer 730. In such instances, the seal member 700 will be composed of the support part 710, the rib 720, and the adhesive layer 730,

Modified Embodiment 4

While the Embodiment above employs a unit cell assembly 200 in which the unit cell constituent member 800 and the seal member 700 are unified with the cathode plate 400 face of the separator 600, the unit cell constituent member 800 and the seal member 700 may instead be unified with the anode plate 300 face of the separator 600. In this instance, the seal member 700 and the anode plate 300 face of the separator 600 will be sealed together by the contact face SU, while the seal member 700 and the cathode plate 400 face will be sealed together by the rib 720. The choice of which face of the separator 600 will be unified with the unit cell constituent member 800 and the seal member 700 may be made appropriately according to considerations such as the fuel cell operation conditions such as the gas pressures of the oxidant gas and fuel gas, as well as the particular design concept. For example, in the Embodiment hereinabove, the cathode side is sealed with the contact face SU by the support part 710, thereby inhibiting deformation of the seal material and ameliorating defective sealing on the cathode side where gas pressure tends to be high. However, according to another design concept whereby precedence is assigned to inhibiting defective sealing of hydrogen for example, defective sealing in relation to hydrogen could be inhibited by sealing the anode side with the contact face SU by the support part 710.

Modified Embodiment 5

In the preceding Embodiment, the seal member 700 is formed through injection molding, but the seal member 700 may instead be formed through compression molding. For example, using a hot vulcanization compression molding process, the spaces SP in the molding die could be filled with solid unvulcanized rubber, and the molding die then locked and heated to simultaneously mold the shape and bring about vulcanization.

Other Modified Embodiments

In the embodiments described above, the edge portion of the unit cell constituent member 800 is flush with a plane, that is, the edge face of the unit cell constituent member 800 is defined by a single plane; however, this need not necessarily be the case. The edge faces of the MEA 810, the anode-side diffusion layer 820, the cathode-side diffusion layer 830, the anode-side porous body 840, and the cathode-side porous body 850 that make up the unit cell constituent member 800 may be situated at respectively offset locations. That is, the edge face of the unit cell constituent member 800 may be defined by multiple faces.

In the embodiments above, materials have been specified for the various parts of the unit cell constituent member 800 and the various parts of the separator 600; however, there is no limitation to these particular materials, and various appropriate materials could be used instead. For example, while the anode-side porous body 840 and the cathode-side porous body 850 herein are made of porous metal bodies, it is possible to form them using other materials such as porous carbon bodies for example. While the separator 600 herein is made of metal, it is possible to use another material such as carbon for example.

In the embodiments above, the separator 600 is composed of three stacked metal plates whose surfaces have flat contours; however, there are any number of other possible configurations for the separator 600, as well as any number of other possible contours of the separator 600.

While the present invention has been shown in detail hereinabove with reference to certain preferred exemplary embodiments, the invention is in no way limited to the embodiments or specific arrangements described herein, and various modifications and equivalent arrangements will be included within the scope of the present invention. While the various elements of the present invention have been shown in various combinations and arrangements herein, these are merely exemplary, it being possible for elements to be optionally added or subtracted, or for a single element to be employed, without departing from the scope of the invention as set forth in the appended claims.

The invention claimed is:

1. A fuel cell comprising:
   a unit cell constituent member;
   a first separator arranged on a cathode side of the unit cell constituent member;
   a second separator arranged on an anode side of the unit cell constituent member; and
   a seal member that is unified with an edge portion of the unit cell constituent member and provides sealing between the first separator and the second separator;
   wherein a bond strength between the seal member and the first separator differs from a bond strength between the seal member and the second separator, and is sufficient to prevent displacement due to an estimated fluid pressure during operation of the fuel cell without fastening force in a stacking direction.

2. The fuel cell according to claim 1, wherein the seal member has a support part that is unified with the edge portion of the unit cell constituent member, and a rib that is formed on the support part, the support part is adhered or intimately attached to the first separator without the aid of a fastening force in the stacking direction and provides sealing with the first separator, and the rib is disposed in contact with the second separator with the aid of the fastening force in the stacking direction and provides sealing with the second separator.

3. The fuel cell according to claim 2, wherein the bond strength between the seal member and the first separator is 0.01 N/mm or more per unit length of seal lines.

4. The fuel cell according to claim 3, wherein the unit cell constituent member comprises an electrolyte layer having catalyst layers arranged on both faces; and gas diffusion layers over the catalyst layers on both faces of the electrolyte layer.

5. The fuel cell according to claim 4, wherein the unit cell constituent member further comprises porous bodies arranged over the diffusion layers and the catalyst layer on both faces of the electrolyte layer.

6. The fuel cell according to claim 2, wherein the unit cell constituent member comprises an electrolyte layer having catalyst layers arranged on both faces; and gas diffusion layers over the catalyst layers on both faces of the electrolyte layer.

7. The fuel cell according to claim 6, wherein the unit cell constituent member further comprises porous bodies arranged over the diffusion layer and the catalyst layer on both faces of the electrolyte layer.

8. The fuel cell according to claim 1, wherein the bond strength between the seal member and the first separator is 0.01 N/mm or more per unit length of seal lines.

9. The fuel cell according to claim 8, wherein the unit cell constituent member comprises an electrolyte layer having catalyst layers arranged on both faces; and gas diffusion layers over the catalyst layers on both faces of the electrolyte layer.

10. The fuel cell according to claim 9, wherein the unit cell constituent member further comprises porous bodies arranged over the diffusion layer and the catalyst layer on both faces of the electrolyte layer.

11. The fuel cell according to claim 1, wherein the unit cell constituent member comprises an electrolyte layer having catalyst layers arranged on both faces; and gas diffusion layers over the catalyst layers on both faces of the electrolyte layer.

12. The fuel cell according to claim 11, wherein the unit cell constituent member further comprises porous bodies arranged over the diffusion layer and the catalyst layer on both faces of the electrolyte layer.

* * * * *